US012568245B2

(12) United States Patent
Ramasubramonian et al.

(10) Patent No.: US 12,568,245 B2
(45) Date of Patent: Mar. 3, 2026

(54) RESIDUAL PREDICTION FOR GEOMETRY POINT CLOUD COMPRESSION

(71) Applicant: QUALCOMM Incorporated, San Diego, CA (US)

(72) Inventors: Adarsh Krishnan Ramasubramonian, Irvine, CA (US); Geert Van der Auwera, San Diego, CA (US); Bappaditya Ray, San Diego, CA (US); Luong Pham Van, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 18/303,373

(22) Filed: Apr. 19, 2023

(65) Prior Publication Data

US 2023/0345044 A1      Oct. 26, 2023

Related U.S. Application Data

(60) Provisional application No. 63/363,307, filed on Apr. 20, 2022.

(51) Int. Cl.
*H04N 19/597*     (2014.01)
*G06T 19/00*      (2011.01)
(52) U.S. Cl.
CPC ......... *H04N 19/597* (2014.11); *G06T 19/006* (2013.01)

(58) Field of Classification Search
None
See application file for complete search history.

(56) References Cited

U.S. PATENT DOCUMENTS

2022/0366612 A1*  11/2022  Taquet .................. H04N 19/96
2024/0020885 A1*  1/2024   Lee ...................... H04N 19/124
2024/0163426 A1*  5/2024   Oh ....................... H04N 19/159

OTHER PUBLICATIONS

Anique Akhtar (UMKC)., et al., "[AI-3DGC] Dynamic Point Cloud Geometry Compression using Sparse Convolutions," 138. MPEG Meeting, Apr. 25, 2022-Apr. 29, 2022, Online, (Motion Picture Expert Group or ISO/IEC JTC1/SC29/WG11), No. m59617, Apr. 18, 2022, XP030301807.
International Search Report and Written Opinion—PCT/US2023/019248—ISA/EPO—Jun. 23, 2023.

(Continued)

*Primary Examiner* — Lindsay J Uhl
(74) *Attorney, Agent, or Firm* — QUALCOMM Incorporated; Espartaco Diaz Hidalgo

(57)                ABSTRACT
A device for decoding a point cloud includes a memory configured to store data representing the point cloud and one or more processors implemented in circuitry and configured to: decode a residual value; determine whether residual prediction is to be applied to a current point of the point cloud; in response to determining that residual prediction is to be applied to the current point of the point cloud: determine a residual predictor and add the residual predictor to the residual value to determine a final residual value; determine a predictor used to predict a current point of the point cloud; and use the predictor and the final residual value to determine a position of the current point.

30 Claims, 19 Drawing Sheets

(56) References Cited

OTHER PUBLICATIONS

ITU-T H.265: "Series H: Audiovisual and Multimedia Systems Infrastructure of Audiovisual Services—Coding of Moving Video," High Efficiency Video Coding, The International Telecommunication Union, Jun. 2019, 696 Pages.

"Technologies Under Consideration in G-PCC," 135. MPEG Meeting, Jul. 12, 2021-Jul. 16, 2021, Online, (Motion Picture Expert Group or ISO/IEC JTC1/SC29/WG11), No. N20648, Aug. 19, 2021, XP030297555.

"Technologies Under Consideration in G-PCC," 137. MPEG Meeting, Jan. 17, 2022-Jan. 21, 2022, Online, (Motion Picture Expert Group or ISO/IEC JTC1/SC29/WG11), N00281, No. n21256, Mar. 10, 2022, pp. 1-85, XP030302342.

* cited by examiner

⊖ Root vertex

◯ Branch vertex with 1 child

⊕ Branch vertex with 2 children

⊘ Branch vertex with 3 children

⊓ Leaf vertex

CURR POINT 900

PREV DEC POINT 902

CURRENT FRAME 904

ADDITIONAL INTER PRED POINT 912

INTER PRED POINT 910

REF POINT WITH SAME SCALED AZIMUTH AND LASERID 906

REFERENCE FRAME 908

SERVER SYSTEM
1612

BITSTREAMS
1608

BITSTREAMS
1608

RESIDUAL PREDICTION FOR GEOMETRY POINT CLOUD COMPRESSION

This application claims the benefit of U.S. Provisional Patent Application 63/363,307, filed 20 Apr. 2022, the entire content of which incorporated herein by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

When using an angular mode for predictive geometry coding in Geometry Point Cloud Compression (G-PCC), a G-PCC coder (e.g., a G-PCC encoder or G-PCC decoder) may perform prediction in the $(r, \phi, i)$ domain. For instance, to code a particular node of a particular frame of a point cloud, the G-PCC coder may determine one or more of a predicted radius r, azimuth $\phi$, and laser index i of the particular node based on another node of the particular frame or a reference frame and add the predicted radius r, azimuth $\phi$, and laser index i of the node to residual data (e.g., one or more of a residual radius r, a residual azimuth $\phi$, and a residual laser index i) to determine a reconstructed radius r, azimuth $\phi$, or laser index i of the particular node. Smaller residual values can typically be coded with fewer bits. As coding the residual data may account for a significant amount of coding overhead, the coding efficiency (e.g., an amount of bits used to code a point) associated with coding point-cloud data may be meaningfully affected by how close the predicted radius r, azimuth $\phi$, and laser index i of the particular node is to the reconstructed radius r, azimuth $\phi$, and laser index i of the particular node.

In accordance with one or more techniques of this disclosure, a G-PCC coder may, in addition to predicting one or more of the radius r, azimuth $\phi$, and laser index i, also predict a residual radius, a residual azimuth, and a residual laser index for a current point of a current frame. For instance, to predict the current point using inter prediction, the G-PCC coder may identify one or more already-coded points and predict one or more parameters (e.g., a radius r, an azimuth $\phi$, and a laser index i) of the current point based on one or more parameters of the one or more already-coded points, and as explained in more detail below, may also predict one or more of the residual radius, the residual azimuth, and the residual laser index. As the combination of the predictor (e.g., the prediction of the radius) and the predicted residual (e.g., the predicted radius residual) may be closer to the original value than the predictor alone, the remaining residual, also referred to herein as a "residual" "residual," may be coded using fewer bits, which may improve overall coding efficiency.

According to an example of this disclosure, a device for decoding a point cloud includes: a memory configured to store data representing the point cloud and one or more processors implemented in circuitry and configured to: decode a residual value; determine whether residual prediction is to be applied to a current point of the point cloud; in response to the determination that residual prediction is to be applied to the current point of the point cloud: determine a residual predictor and add the residual predictor to the residual value to determine a final residual value; determine a predictor used to predict a current point of the point cloud; and use the predictor and the final residual value to determine a position of the current point.

According to an example of this disclosure, a device for encoding a point cloud includes: a memory to store data representing the point cloud; and one or more processors implemented in circuitry and configured to: determine a predictor to predict a current point of the point cloud; determine a residual value for the current point; determine whether residual prediction is to be applied for the current point; encode syntax indicative of whether residual prediction is applied for the current point; in response to the determination that residual prediction is to be applied, determine a signaled residual value obtained by subtracting a residual predictor from the residual value for the current point; and encode the signaled residual value.

According to an example of this disclosure, a method for decoding a point cloud includes: decoding a residual value; determining whether residual prediction is applied; in response to determining that residual prediction is to be applied to the current point of the point cloud: determining a residual predictor and add the residual predictor to the residual value to determine a final residual value; determining a predictor used to predict a current point of the point cloud; and using the predictor and the final residual value to determine a position of the current point.

A computer-readable storage medium stores instructions that when executed by one or more processors cause the one or more processors to: decode a residual value; determine whether residual prediction is applied; in response to the determination that residual prediction is to be applied to the current point of the point cloud: determine a residual predictor and add the residual predictor to the residual value to determine a final residual value; determine a predictor used to predict a current point of the point cloud; and use the predictor and the final residual value to determine a position of the current point.

The details of one or more examples are set forth in the accompanying drawings and the description below. Other features, objects, and advantages will be apparent from the description, drawings, and claims.

BRIEF DESCRIPTION OF DRAWINGS

FIG. 16 is a conceptual diagram illustrating an example vehicle-based scenario in which one or more techniques of this disclosure may be used.

DETAILED DESCRIPTION

When using an angular mode for predictive geometry coding in Geometry Point Cloud Compression (G-PCC), a G-PCC coder (e.g., a G-PCC encoder or G-PCC decoder) may perform prediction in the (r, φ, i) domain. For instance, to code a particular node of a particular frame of a point cloud, the G-PCC coder may determine one or more of a predicted radius r, azimuth φ, and laser index i of the particular node based on another node of the particular frame or a reference frame and add the predicted radius r, azimuth φ, and laser index i of the node to residual data (e.g., one or more of a residual radius r, a residual azimuth φ, and a residual laser index i) to determine a reconstructed radius r, azimuth φ, or laser index i of the particular node. Smaller residual values can typically be coded with fewer bits. Because coding the residual data may account for a significant amount of coding overhead, the coding efficiency (e.g., an amount of bits used to code a point) associated with coding point-cloud data may be meaningfully affected by how close the predicted radius r, azimuth φ, and laser index i of the particular node is to the reconstructed radius r, azimuth φ, and laser index i of the particular node.

In accordance with one or more techniques of this disclosure, a G-PCC coder (e.g., a G-PCC encoder or a G-PCC decoder) may, in addition to predicting one or more of the radius r, azimuth φ, and laser index i, also predict a residual radius, a residual azimuth, and a residual laser index for a current point of a current frame. For instance, to predict the current point using inter prediction, the G-PCC coder may identify one or more already-coded points and predict one or more parameters (e.g., a radius r, an azimuth φ, and a laser index i) of the current point based on one or more parameters of the one or more already-coded points, and as explained in more detail below, may also determine a residual predictor, e.g., a predicted residual value for one or more of the residual radius, the residual azimuth, or the residual laser index. When using residual prediction, the G-PCC decoder may decode a residual value and add the residual predictor to the residual value to determine a final residual value. The G-PCC decoder may then add the final residual value to a predictor to determine a position of the current point. As the combination of the predictor (e.g., the prediction of the radius) and the predicted residual (e.g., the predicted radius residual) may be closer to the original value than the predictor alone, the decoded residual, i.e., the remaining residual, also referred to herein as a "residual" "residual," may be coded using fewer bits compared to if entire final residual were to be coded, which may improve overall coding efficiency.

Figure 1:
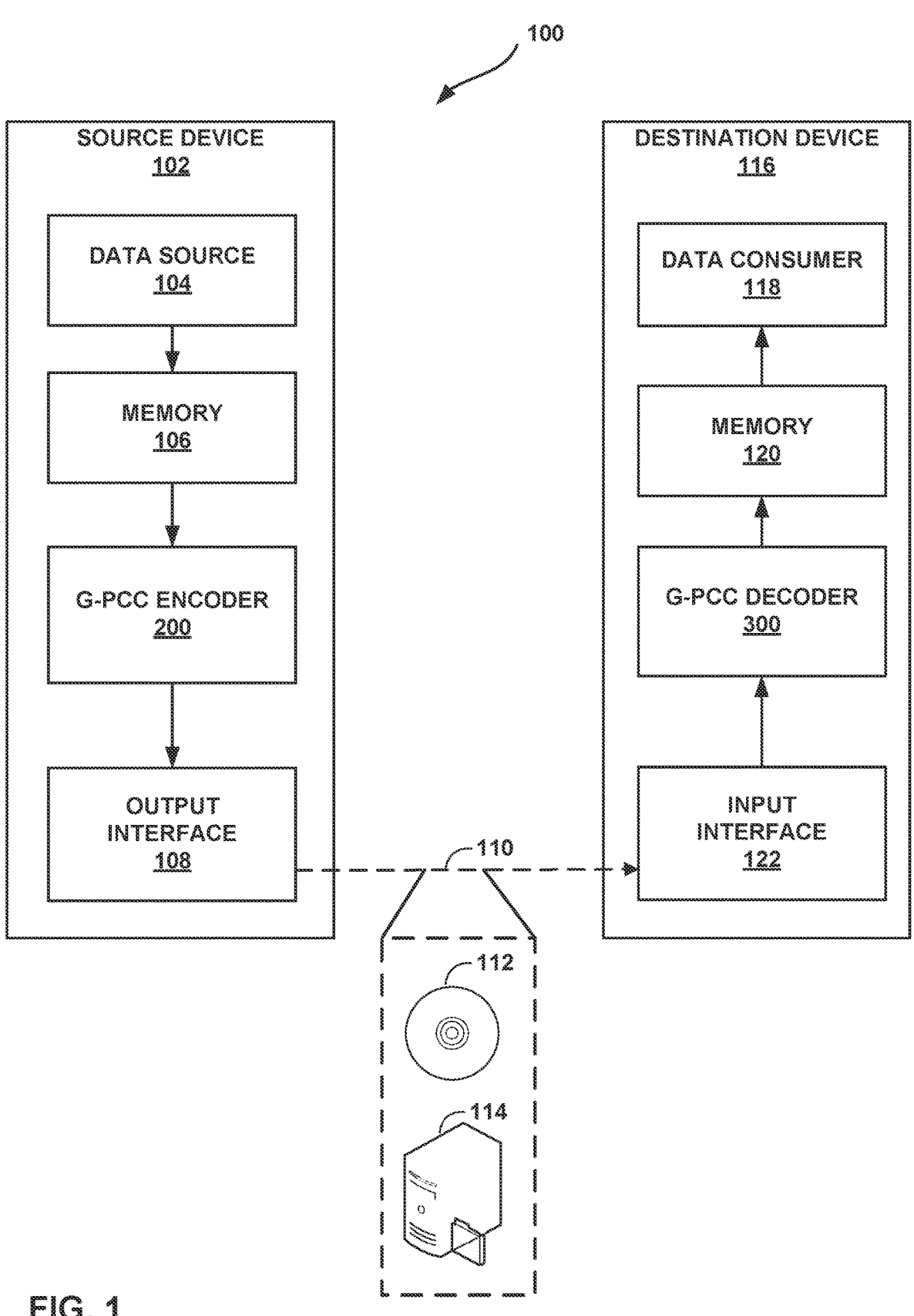
FIG. 1 is a block diagram illustrating an example encoding and decoding system that may perform the techniques of this disclosure.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to inter-prediction processes for point cloud compression. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to inter-prediction processes for point cloud compression. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding specification, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19088, Brussels, Belgium, January 2020, and a description of the codec is available in G-PCC Codec Description v6, ISO/IEC JTC1/SC29/WG11 w19091, Brussels, Belgium, January 2020.

A point cloud contains a set of points in a 3D space and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data is used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
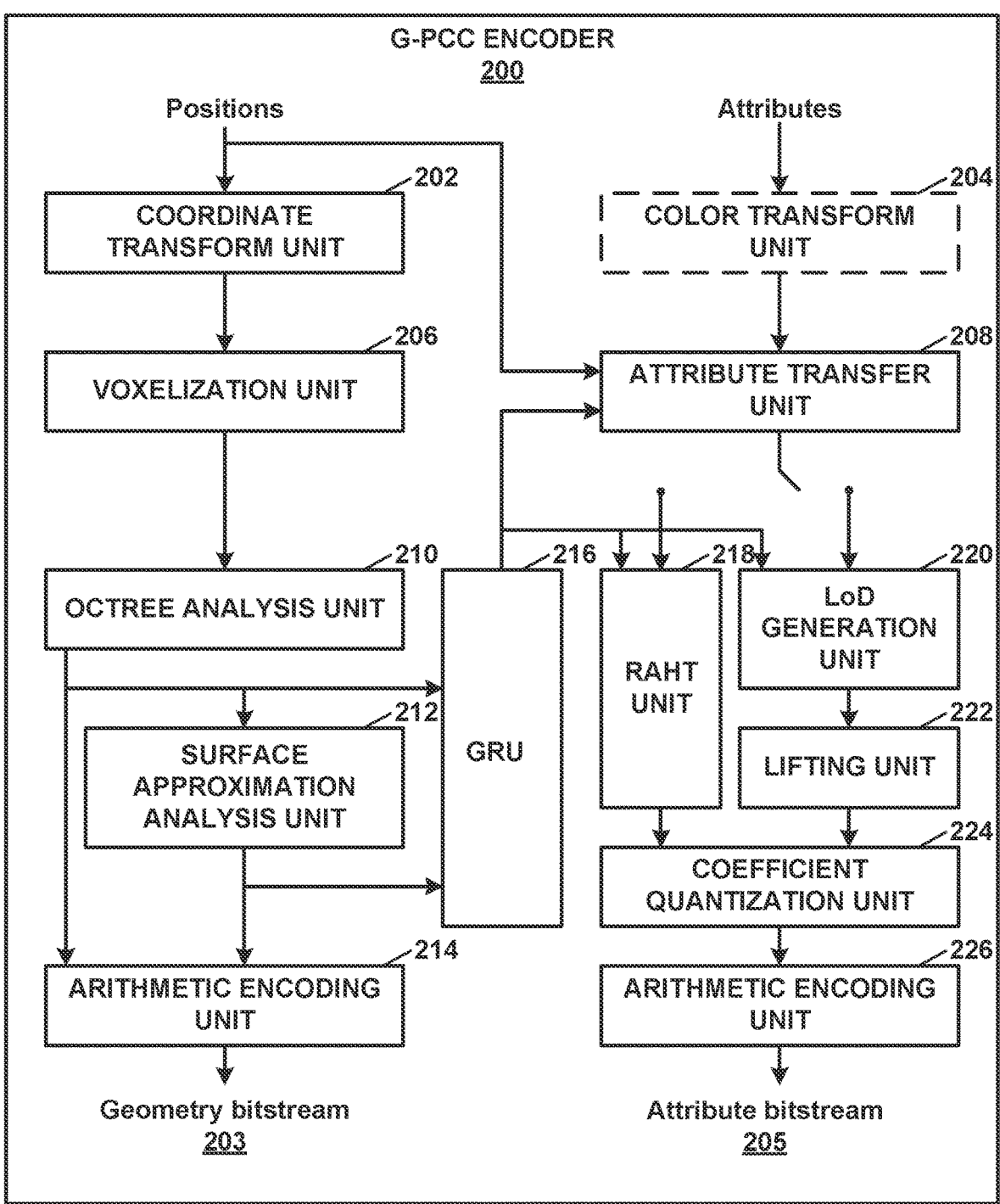
FIG. 2 is a block diagram illustrating an example Geometry Point Cloud Compression (G-PCC) encoder.
Figure 3:
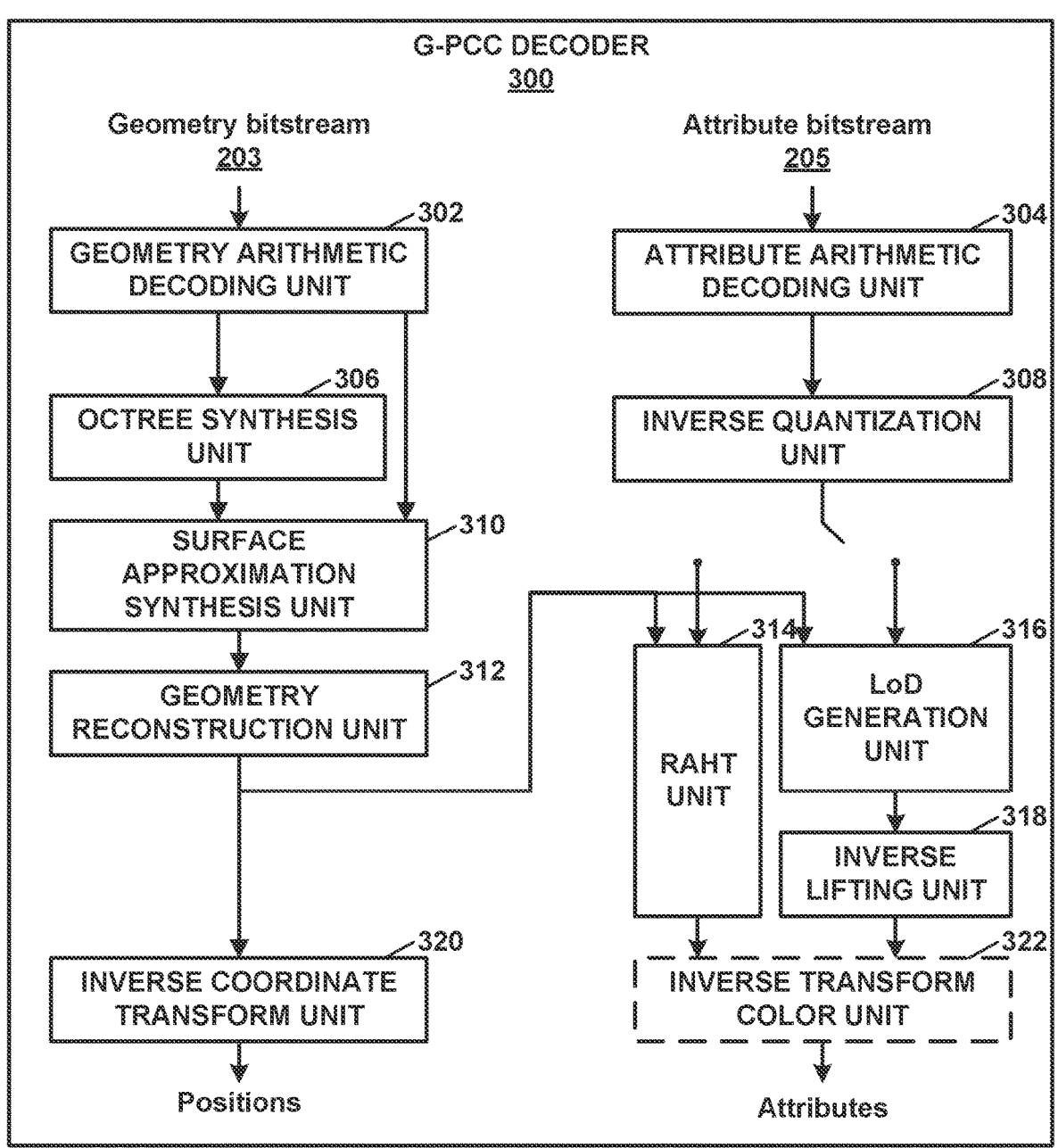
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, surface approximation analysis unit 212, RAHT unit 218, surface approximation synthesis unit 310, and RAHT unit 314 are options typically used for Category 1 data. LoD generation unit 220, lifting unit 222, LoD generation unit 316, and inverse lifting unit 318 are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

Figure 4:
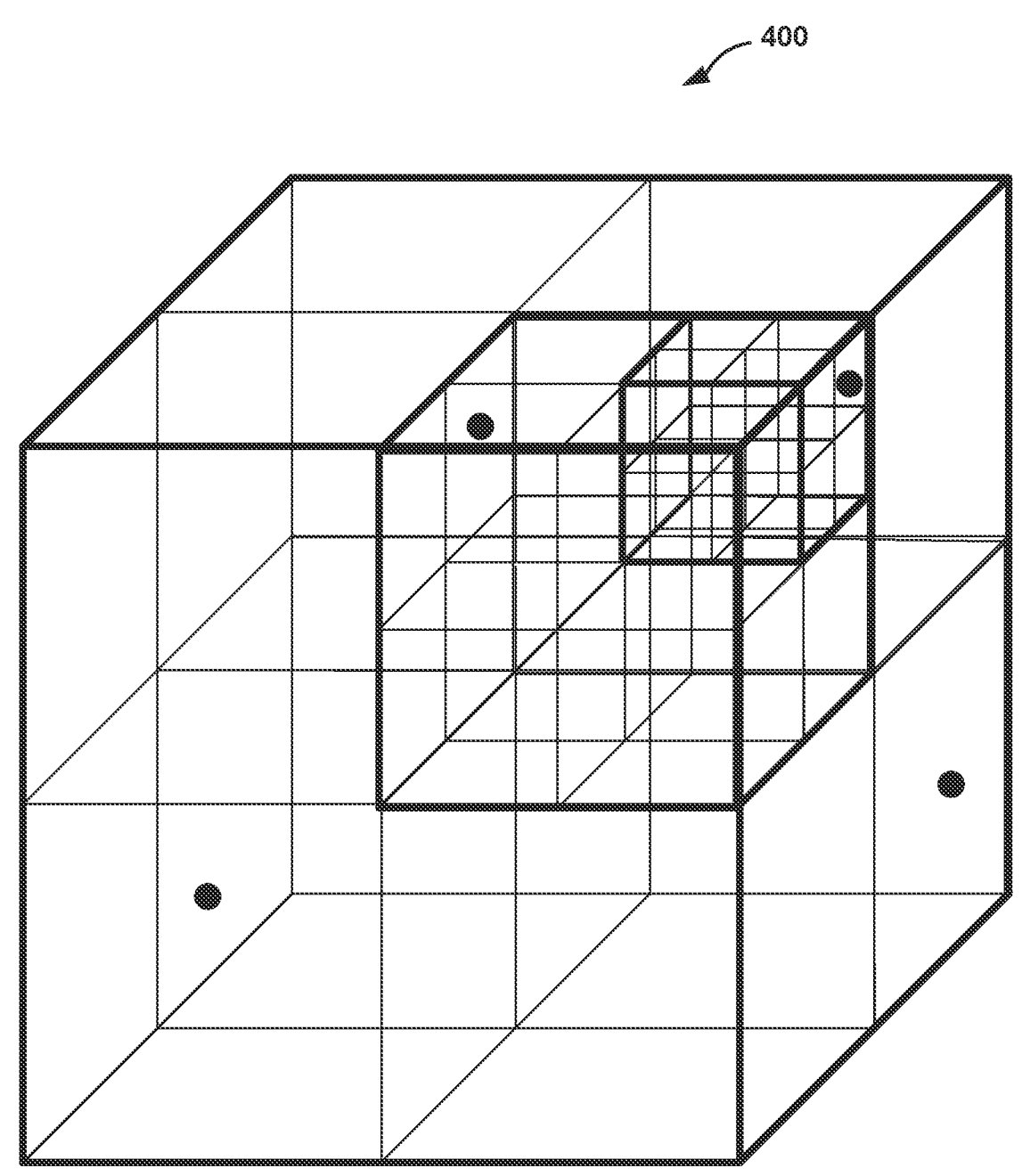
FIG. 4 is a conceptual diagram illustrating an example octree split for geometry coding.

FIG. 4 is a conceptual diagram illustrating an example octree split for geometry coding according to the techniques of this disclosure. In the example shown in FIG. 4, octree 400, may be split into a series of nodes. For example, each node may be a cubic node. At each node of an octree, G-PCC encoder 200 may signal an occupancy of a node by a point of the point cloud to G-PCC decoder 300, when the occupancy is not inferred by G-PCC decoder 300, for one or more of the node's child nodes, which may include up to eight nodes. Multiple neighborhoods are specified including (a) nodes that share a face with a current octree node, (b) nodes that share a face, edge, or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. With a direct mode, positions of points in the point cloud may be coded directly without any compression. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding processes in G-PCC: Region Adaptive Hierarchical Transform (RAHT) coding, interpolation-based hierarchical nearest-neighbor prediction (Predicting Transform), and interpolation-based hierarchical nearest-neighbor prediction with an update/lifting step (Lifting Transform). RAHT and Lifting are typically used for Category 1 data, while Predicting is typically used for Category 3 data. However, either process may be used for any data, and as with the geometry codecs in G-PCC, the attribute coding process used to code the point cloud is specified in the bitstream.

The coding of the attributes may be conducted in a level-of-detail (LoD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding processes for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit (GRU) 216, an RAHT unit 218, an LoD generation unit 220, a lifting unit 222, a coefficient quantization unit 224, and an arithmetic encoding unit 226.

As shown in the example of FIG. 2, G-PCC encoder 200 may obtain a set of positions of points in the point cloud and a set of attributes. G-PCC encoder 200 may obtain the set of positions of the points in the point cloud and the set of attributes from data source 104 (FIG. 1). The positions may include coordinates of points in a point cloud. The attributes may include information about the points in the point cloud, such as colors associated with points in the point cloud. G-PCC encoder 200 may generate a geometry bitstream 203 that includes an encoded representation of the positions of the points in the point cloud. G-PCC encoder 200 may also generate an attribute bitstream 205 that includes an encoded representation of the set of attributes.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in geometry bitstream 203. Geometry bitstream 203 may also include other syntax elements, including syntax elements that are not arithmetically encoded.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes, with such transformations continuing until the top root node. The tree traversal for encoding is from top to bottom used to calculate the weights to be used for the coefficients, with the transform order being from bottom to top. The coefficients may then be quantized and coded.

Alternatively or additionally, LoD generation unit 220 and lifting unit 222 may apply LoD processing and lifting, respectively, to the attributes of the reconstructed points. LoD generation is used to split the attributes into different refinement levels. Each refinement level provides a refinement to the attributes of the point cloud. The first refinement level provides a coarse approximation and contains few points, with the subsequent refinement levels typically containing more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LoD 1 is obtained based on refinement level RL1, LoD 2 is obtained based on RL1 and RL2, LoD N is obtained by union of RL1, RL2, . . . RLN. In some cases, LoD generation may be followed by a prediction scheme (e.g., predicting transform) where attributes associated with each point in the LoD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, an LoD generation unit 316, an inverse lifting unit 318, an inverse transform coordinate unit 320, and an inverse transform color unit 322.

G-PCC decoder 300 may obtain a geometry bitstream 203 and attribute bitstream 205. Geometry arithmetic decoding unit 302 of G-PCC decoder 300 may apply arithmetic decoding (e.g., Context-Adaptive Binary Arithmetic Coding (CABAC) or other type of arithmetic decoding) to syntax elements in geometry bitstream 203. Similarly, attribute arithmetic decoding unit 304 may apply arithmetic decoding to syntax elements in attribute bitstream 205.

Octree synthesis unit 306 may synthesize an octree based on syntax elements parsed from geometry bitstream 203. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level. At the final level of the octree, each node corresponds to a voxel position. When the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in geometry bitstream 203, surface approximation synthesis unit 310 may determine a surface model based on syntax elements parsed from geometry bitstream 203 and based on the octree.

Furthermore, geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled, which indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec are coded in the integer domain. The inverse transform may be used to convert the positions back to the original domain.

Additionally, in the example of FIG. 3, inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at G-PCC encoder 200. Alternatively, LoD generation unit 316 and inverse lifting unit 318 may determine color values for points of the point cloud using a level of detail-based technique. LoD generation unit 316 decodes each LoD giving progressively finer representations of the attribute of points. With a predicting transform, LoD generation unit 316 derives the prediction of the point from a weighted sum of points that are in prior LoDs, or previously reconstructed in the same LoD. LoD generation unit 316 may add the prediction to the residual (which is obtained after inverse quantization) to obtain the reconstructed value of the attribute. When the lifting scheme is used, LoD generation unit 316 may also include an update operator to update the coefficients used to derive the attribute values. LoD generation unit 316 may also apply an inverse adaptive quantization in this case.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by G-PCC encoder 200 and G-PCC decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

For geometry, two different types of coding techniques exist: Octree and predictive-tree coding. Octree coding will now be described in more detail. For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model (known as trisoup coding). The surface model used is a triangulation comprising 1-10 triangles per block, resulting in a triangle soup. At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly.

A flag may be signaled to indicate that a direct mode is signaled. At the lowest level, the number of points associated with the octree node/leaf node may also be coded.

Predictive geometry coding is an alternative to the octree geometry coding, where the nodes are arranged in a tree structure (which defines the prediction structure), and various prediction strategies may be used to predict the coordinates of each node in the tree with respect to its predictors.

Figure 5:
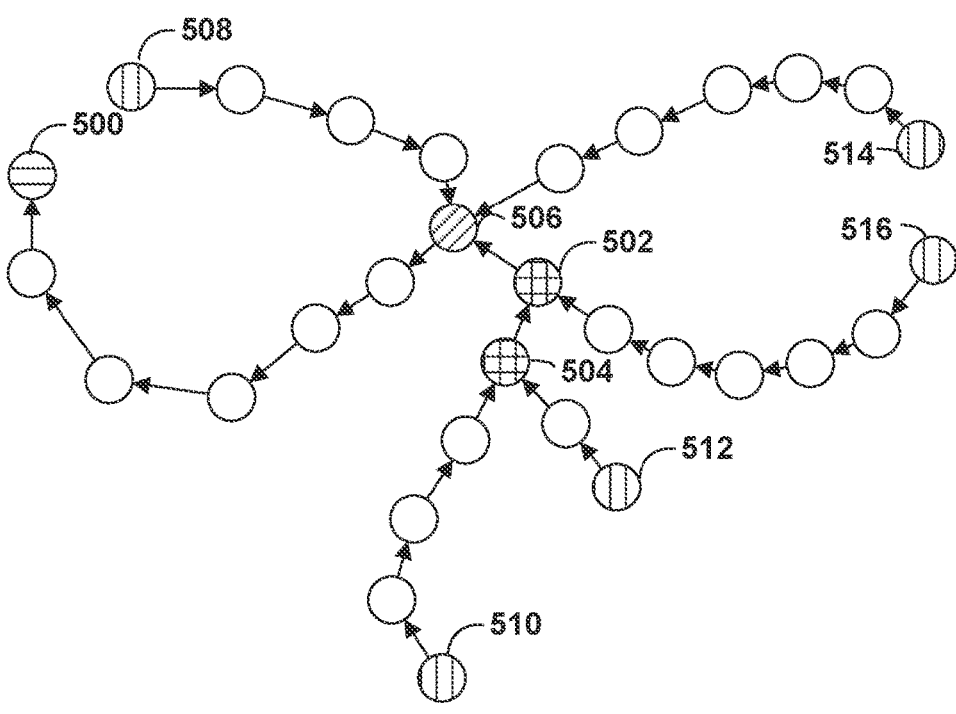
FIG. 5 is a conceptual diagram illustrating an example of a prediction tree.

FIG. 5 is a conceptual diagram illustrating an example of a prediction tree 500. In the example of FIG. 5, prediction tree 500 is shown as a directed graph where arrows point to the prediction direction. The horizontally lined node 501 is the root node and has no predictors. Double-lined nodes (e.g., nodes 502, 504) have two children; the diagonally lined node (e.g., node 506) has 3 children; the open nodes have one child and the vertically lined nodes (e.g., nodes 508, 510, 512, 514, and 516) are leaf nodes and these have no children. Every node aside from the root node has only one parent node.

Four prediction strategies are specified for each node based on the parent (p0), grand-parent (p1), and great-grand-parent (p2) of the node, as follows:

No prediction/zero prediction (0)

Delta prediction (p0)

Linear prediction (2*p0−p1)

Parallelogram prediction (p0+p1−p2)

G-PCC encoder 200 may be configured to generate the prediction tree. The algorithm used may be determined based on the application or use case and may encompass any of several different strategies. Some examples of such strategies are described in G-PCC Codec Description, ISO/IEC JTC 1/SC29/WG 7 MDS20983, Teleconference, October 2021.

For each node, the residual coordinate values are coded in the bitstream starting from the root node in a depth-first manner.

Predictive geometry coding is useful mainly for Category 3 (LIDAR-acquired) point cloud data, e.g., for low-latency applications.

Figure 6A:
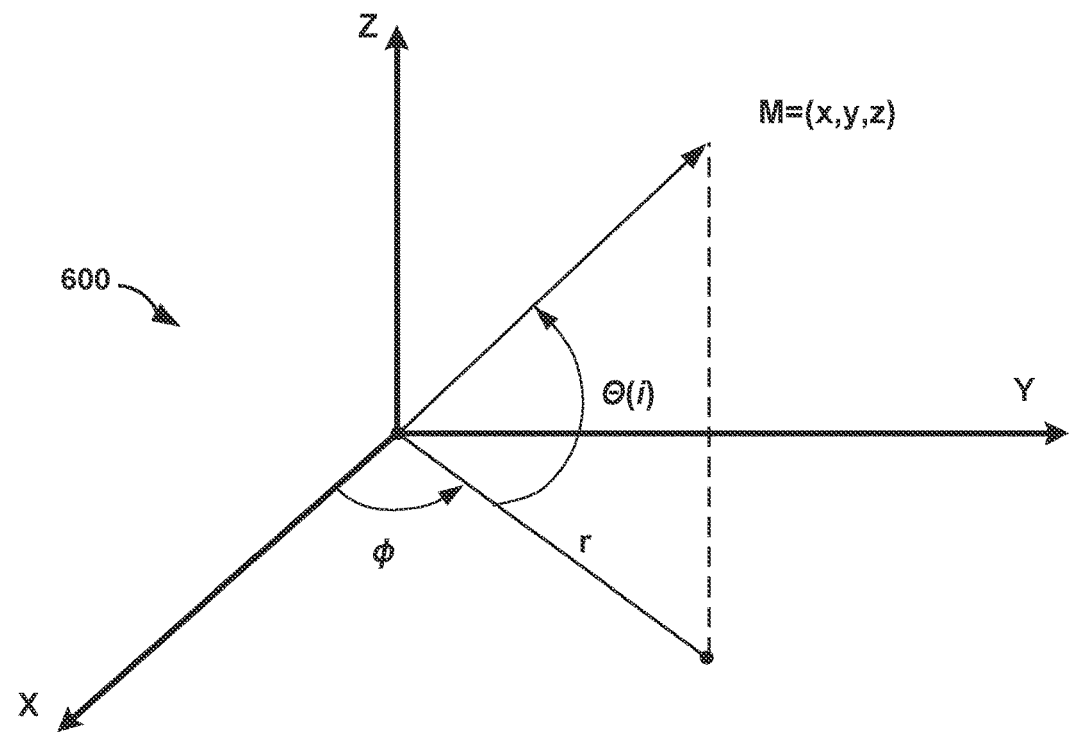
FIG. 6A and FIG. 6B are conceptual diagrams illustrating an example spinning Lidar acquisition model.

G-PCC encoder 200 and G-PCC decoder 300 may be configured to use an angular mode for predictive geometry coding. An angular mode may be used in predictive geometry coding, where the characteristics of LIDAR sensors may be utilized in coding the prediction tree more efficiently. The coordinates of the positions are converted to the $(r, \phi, i)$ (radius, azimuth and laser index) domain and a prediction is performed in this domain (the residuals are coded in r, $\phi$, i domain). FIG. 6A shows an example of coordinate system 600, which is in the $(r, \phi, i)$ (radius, azimuth and laser index) domain. Due to the errors in rounding, coding in r, $\phi$, i is not lossless and hence a second set of residuals are coded which correspond to the Cartesian coordinates. A description of the encoding and decoding strategies used for angular mode for predictive geometry coding is provided below.

Figure 6B:
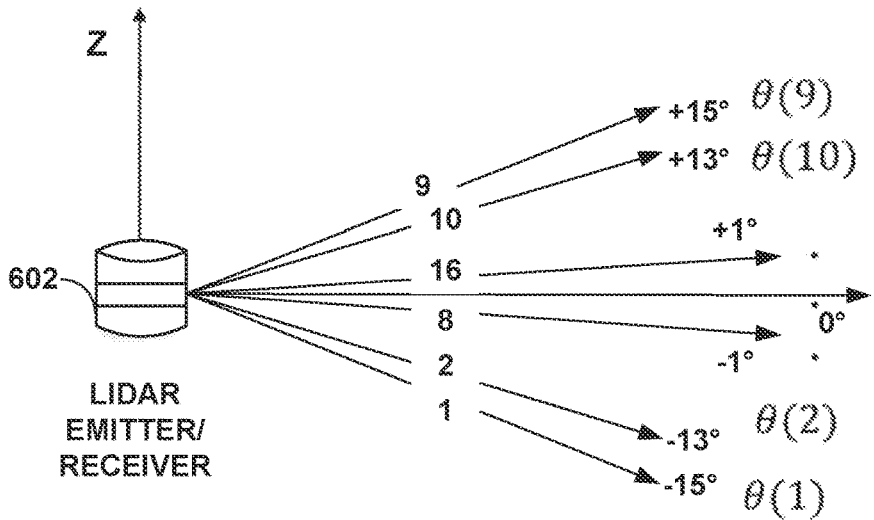

The process focuses on point clouds acquired using a spinning Lidar model, such as LIDAR emitter/receiver 602. Here, LIDAR emitter/receiver 602 has N lasers (e.g., N=16, 32, 64) spinning around the Z axis according to an azimuth angle $\phi$ (see FIG. 6A and FIG. 6B). Each laser may have different elevation $\theta(i)_{i=1 \ldots N}$ and height $\zeta(i)_{i=1 \ldots N}$. Let's suppose that the laser i hits a point M, with cartesian integer coordinates (x, y, z), defined according to the coordinate system described in FIGS. 6A and 6B. In other words, FIG. 6A and FIG. 6B are conceptual diagrams illustrating an example spinning Lidar acquisition model.

The position of M is modelled with three parameters (r, $\phi$, i), which may be computed as follows:

$$r = \sqrt{x^2 + y^2}$$

$$\phi = a\tan 2(y, x)$$

$$i = \arg\min_{j=1\ldots N}\{z + \varsigma(j) - r \times \tan(\theta(j))\},$$

The coding process may use the quantized version of $(r, \phi, i)$, denoted $(\tilde{r}, \tilde{\phi}, i)$, where the three integers $\tilde{r}$, $\tilde{\phi}$, and $i$ may be computed as follows:

$$\tilde{r} = \text{floor}\left(\frac{\sqrt{x^2 + y^2}}{q_r} + o_r\right) = hypot(x, y)$$

$$\tilde{\phi} = \text{sign}(a\tan 2(y, x)) \times \text{floor}\left(\frac{|a\tan 2(y, x)|}{q_\phi} + o_\phi\right)$$

$$i = \arg\min_{j=1\ldots N}\{z + \varsigma(j) - r \times \tan(\theta(j))\}$$

where $(q_r, o_r)$ and $(q_\phi, o_\phi)$ are quantization parameters controlling the precision of $\tilde{\phi}$ and $\tilde{r}$, respectively.

sign(t) is the function that return 1 if t is positive and (−1) otherwise.

|t| is the absolute value of t.

To avoid reconstruction mismatches due to the use of floating-point operations, the values of $\zeta(i)_{i=1\ldots N}$ and $\tan(\theta(i))_{i=1\ldots N}$ may be pre-computed and quantized as follows:

$$\tilde{z}(i) = \text{sign}(\varsigma(i)) \times \text{floor}\left(\frac{|\varsigma(i)|}{q_\varsigma} + o_\varsigma\right)$$

$$\tilde{t}(i) = \text{sign}\left(\varsigma(\tan(\theta(j))) \times \text{floor}\left(\frac{|\tan(\theta(j))|}{q_\theta} + o_\theta\right)\right)$$

where $(q_\varsigma, o_\varsigma)$ and $(q_\theta, o_\theta)$ are quantization parameters controlling the precision of S and $\tilde{\theta}$, respectively.

The reconstructed cartesian coordinates are obtained as follows:

$\hat{x} = \text{round}(\tilde{r} \times q_r \times app\_cos(\tilde{\phi} \times q_\phi))$
$\hat{y} = \text{round}(\tilde{r} \times q_r \times app\_sin(\tilde{\phi} \times q_\phi))$
$\hat{z} = \text{round}(\tilde{r} \times q_r \times \tilde{t}(i) \times q_\theta - \tilde{z}(i) \times q_\varsigma),$ where app_cos(•) and app_sin(•) are approximation of cos(•) and sin(•). The calculations could be using a fixed-point representation, a look-up table and linear interpolation.

In some examples, $(\hat{x}, \hat{y}, \hat{z})$ may be different from $(x, y, z)$ due to reasons, such as quantization, approximations, model imprecision, or model parameters imprecisions.

In some examples, the reconstruction residuals $(r_x, r_y, r_z)$ can be defined as follows:

$r_x = x - \hat{x}$ $r_y = y - \hat{y}$ $r_z = z - \hat{z}$

In this process, G-PCC encoder 200 may proceed as follows:

Encode the model parameters $\tilde{t}(i)$ and $\tilde{z}(i)$ and the quantization parameters $q_r$, $q_\varsigma$, $g_\theta$ and $q_\phi$ Apply the geometry predictive scheme described in Text of ISO/IEC FDIS 23090-9 Geometry-based Point Cloud Compression, ISO/IEC JTC 1/SC29/WG 7 m55637, Teleconference, October 2020, to the representation $(\tilde{r}, \tilde{\phi}, i)$ A new predictor leveraging the characteristics of lidar may be introduced. For instance, the rotation speed of the lidar scanner around the z-axis is usually constant and, therefore, the current $\tilde{\phi}(j)$ may be predicted as follows:

$$\tilde{\phi}(j) = \tilde{\phi}(j-1) + n(j) \times \delta_\phi(k)$$

Where $(\delta_\phi(k))_{k=1\ldots K}$ is a set of potential speeds the encoder could choose from. The index k could be explicitly written to the bitstream or could be inferred from the context based on a deterministic strategy applied by both the encoder and the decoder, and n(j) is the number of skipped points which may be explicitly signaled in the bitstream or may be inferred from the context based on a deterministic strategy applied by both G-PCC encoder 200 and G-PCC decoder 300. n(j) may also be referred to as a "phi multiplier" later in this disclosure. n(j) is currently used only with a delta predictor, which corresponds to a previously coded point in decoding order, such as the preceding node in decoding order or the parent node.

Encode with each node the reconstruction residuals $(r_x, r_y, r_z)$

G-PCC decoder 300 may proceed as follows:

Decodes the model parameters $\tilde{t}(i)$ and $\tilde{z}(i)$ and the quantization parameters $q_r$, $q_\varsigma$, $q_\theta$ and $q_\phi$ Decodes the $(\tilde{r}, \tilde{\phi}, i)$ parameters associated with the nodes according to the geometry predictive scheme described in [1]

Computes the reconstructed coordinates $(\hat{x}, \hat{y}, \hat{z})$ as described above Decodes the residuals $(r_x, r_y, r_z)$ As discussed in more detail below, lossy compression may be supported by quantizing the reconstruction residuals $(r_x, r_y, r_z)$ Compute the original coordinates $(x, y, z)$ as follows $x = r_x + \hat{x}$ $y = r_y + \hat{y}$ $z = r_z + \hat{z}$ Lossy compression may be achieved by applying quantization to the reconstruction residuals $(r_x, r_y, r_z)$ or by dropping points.

The quantized reconstruction residuals are computed as follows:

$$\tilde{r}_x = \text{sign}(r_x) \times \text{floor}\left(\frac{|r_x|}{q_x} + o_x\right)$$

$$\tilde{r}_y = \text{sign}(r_y) \times \text{floor}\left(\frac{|r_y|}{q_y} + o_y\right)$$

$$\tilde{r}_z = \text{sign}(r_z) \times \text{floor}\left(\frac{|r_z|}{q_z} + o_z\right)$$

Where $(q_x, o_x)$, $(q_y, o_y)$ and $(q_z, o_z)$ are quantization parameters controlling the precision of $\tilde{r}_x$, $\tilde{r}_y$ and $\tilde{r}_z$, respectively.

In some examples, G-PCC encoder 200 and G-PCC decoder 300 may use Trellis quantization to further improve the RD (rate-distortion) performance results. The quantization parameters may change at sequence/frame/slice/block level to achieve region adaptive quality and for rate control purposes.

G-PCC encoder 200 and G-PCC decoder 300 may be configured to use inter prediction for predictive geometry coding. Predictive geometry coding uses a prediction tree structure to predict the positions of the points. When angular coding is enabled, the x, y, z coordinates are transformed to radius, azimuth and laserID and residuals are signaled in these three coordinates as well as in the x, y, z dimensions. The intra prediction used for radius, azimuth and laserID may be one of four modes and the predictors are the nodes that are classified as parent, grand-parent and great-grand-parent in the prediction tree with respect to the current node. The predictive geometry coding, as currently designed in G-PCC Ed.1, is an intra coding tool that only uses points in the same frame for prediction. Additionally, using points from previously decoded frames may provide a better prediction and thus better compression performance.

For inter prediction, it was initially proposed to predict the radius of a point from a reference frame. For each point in the prediction tree, G-PCC decoder 300 may determine whether the point is inter predicted or intra predicted (indicated by a flag). When intra predicted, G-PCC decoder 300 may use the intra prediction modes of predictive geometry coding for prediction. When inter-prediction is used, the azimuth and laserID are still predicted with intra prediction, while the radius is predicted from the point in the reference frame that has the same laserID as the current point and an azimuth that is closest to the current azimuth. A further improvement of this process also enables inter prediction of the azimuth and laserID in addition to radius prediction. When inter-coding is applied, the radius, azimuth and laserID of the current point are predicted based on a point that is near the azimuth position of a previously decoded point in the reference frame. In addition, separate sets of contexts are used for inter and intra prediction.

Figure 7:
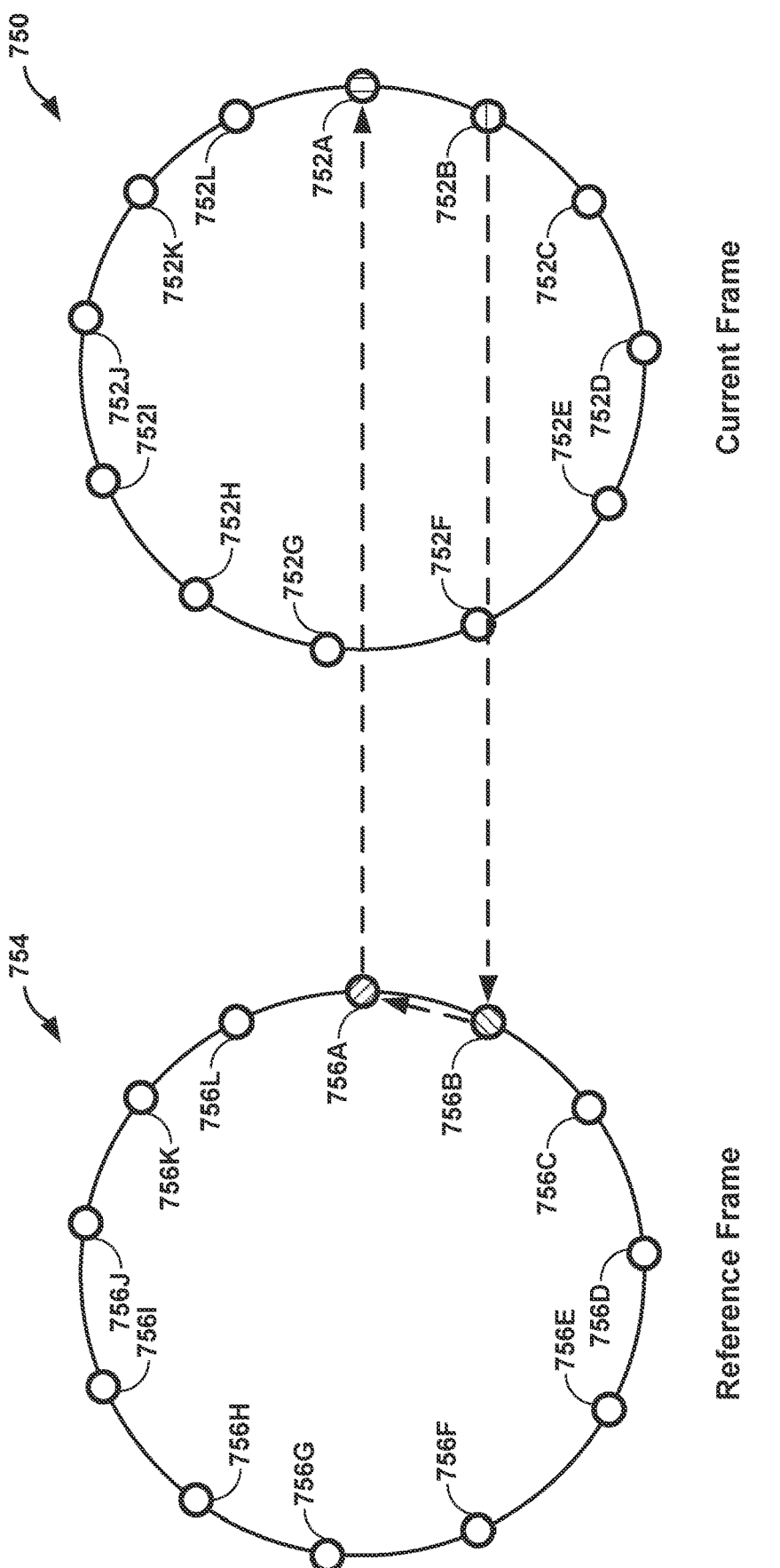
FIG. 7 is a conceptual diagram illustrating an example inter prediction process for predicting points of a point cloud, in accordance with one or more aspects of this disclosure.

FIG. 7 is a conceptual diagram illustrating an example of inter-prediction of a current point (e.g., 752A) from a point (e.g., 756A) in the reference frame 754. The extension of inter prediction to azimuth, radius, and laserID may include the following steps:

For a given point (e.g., 752A), choose the previous decoded point (e.g., 752B);

Choose a position in the reference frame (e.g., 756B) that has same scaled azimuth and laserID as the previous decoded point (e.g., 752B); and In a reference point cloud frame (e.g., frame 754), find the first point (e.g., 756A) that has an azimuth greater than that of the position in the reference frame (e.g., 756B). The inter prediction point (e.g., 756A) may also be referred to as the "Next" inter predictor.

As shown in FIG. 7, current frame 750 may include a plurality of points 752A-752L (collectively, "points 752") and reference frame 754 may include a plurality of points 756A-756L (collectively, "points 756"). Reference frame 754 may be a frame that is encoded and/or reconstructed prior to current frame 750 being decoded and/or reconstructed (e.g., reference frame 754 may precede current frame 750 in a coding order). G-PCC encoder 200 and G-PCC decoder 300 may utilize intra prediction to predict one or more of points 752 of current frame 750 based on one or more of points 756 of reference frame 754. For instance, G-PCC decoder 300 (or a reconstruction loop of G-PCC encoder 200) may predict one or more parameters (e.g., (r, φ, i) of current point 752A of points 752 based on one or more of points 756.

To perform intra prediction to predict a current point in a current frame, G-PCC encoder 200 and G-PCC decoder 300 may determine a reference point in a reference frame that is different than the current frame and predict one or more parameters of the current point based on the reference point. For instance, to predict current point 752A, G-PCC encoder 200 and G-PCC decoder 300 may determine reference point 756A and predict one or more parameters of current point 752A based on one or more parameters of reference points 756A. The determined reference point may be referred to as an identified reference point.

G-PCC encoder 200 and G-PCC decoder 300 may determine the reference point using any suitable technique. As one example, G-PCC encoder 200 and G-PCC decoder 300 may determine, in the current frame, a pivot point that precedes the current point in a coding order; and determine, based on one or more parameters of the pivot point, the reference point. For instance, where the coding order is counter-clockwise, G-PCC encoder 200 and G-PCC decoder 300 may determine that point 752B is the previous point of current point 752A (e.g., the point that immediately precedes the current point in the coding order) (i.e., determine that point 752B is the pivot point), and determine a reference point based on one or more parameters of pivot point 752B.

To determine the reference point based on the one or more parameters of the pivot point, the G-PCC encoder 200 and G-PCC decoder 300 may determine, in the reference frame, a reference pivot point based on an azimuth of the pivot point; and determine the reference point based on the reference pivot point. For instance, G-PCC encoder 200 and G-PCC decoder 300 may determine, in reference frame 754, a point having a same azimuth (or same azimuth and same laser ID) as pivot point 752B. In the example of FIG. 7, G-PCC encoder 200 and G-PCC decoder 300 may determine that point 756B is the reference pivot point as point 756B bas a same azimuth as pivot point 752B. While the reference pivot point in the example of FIG. 7 corresponds to an actual point (e.g., an actual point in frame 754), the techniques of this disclosure are not necessarily so limited. For instance, in some examples, the reference pivot point may be a virtual point that does not correspond to a reconstructed point in reference frame 754.

In some examples, G-PCC encoder 200 and G-PCC decoder 300 may determine the reference pivot point based on an actual (e.g., unscaled) azimuth of the pivot point. In other examples, G-PCC encoder 200 and G-PCC decoder 300 may determine the reference pivot point based on a scaled azimuth of the pivot point. For instance, G-PCC encoder 200 and G-PCC decoder 300 may determine the scaled azimuth by scaling the azimuth of the pivot point by a constant value.

To determine the reference point based on the reference pivot point, G-PCC encoder 200 and G-PCC decoder 300 may identify, as the reference point in the reference frame, a point having an azimuth that greater than an azimuth of the reference pivot point. For instance, G-PCC encoder 200 and G-PCC decoder 300 may determine which of points 756 have azimuth values greater than an azimuth value of the reference pivot point, and select (from the set of points 756 having azimuth values greater than the azimuth value of the reference pivot point) the point having the smallest azimuth value. In this example of FIG. 7, point 756A may be the point in reference frame 754 that has the smallest azimuth that is larger than the azimuth of reference pivot point 765B. As such, G-PCC encoder 200 and G-PCC decoder 300 may identify point 756A as the reference point for performing intra prediction of current point 752A.

In some examples, G-PCC encoder 200 and G-PCC decoder 300 may determine the reference point based on an actual (e.g., unscaled) azimuth of the reference pivot point.

In other examples, G-PCC encoder 200 and G-PCC decoder 300 may determine the reference point based on a scaled azimuth of the reference pivot point. For instance, G-PCC encoder 200 and G-PCC decoder 300 may determine the scaled azimuth of the reference pivot point by scaling the azimuth of the pivot point by a constant value. As such, in some examples, G-PCC encoder 200 and G-PCC decoder 300 may determine the reference point by identifying, as the reference point, a point having a smallest scaled azimuth that is larger than the scaled azimuth of the reference pivot point (e.g., point 756A). In some examples, G-PCC encoder 200 and G-PCC decoder 300 may utilize the point with the second smallest azimuth greater than the scaled azimuth. For instance, G-PCC encoder 200 and G-PCC decoder 300 may determine the reference point by identifying, as the reference point, a point having a second smallest scaled azimuth that is larger than the scaled azimuth of the reference pivot point (e.g., point 756L).

G-PCC encoder 200 and G-PCC decoder 300 may predict parameters of current point 752A based on parameters of reference point 756A. For instance, G-PCC encoder 200 and G-PCC decoder 300 may signal a residual data that represents differences between parameters of current point 752A and reference point 756A. G-PCC decoder 300 may add the residual data to the parameters of reference point 756A to reconstruct the parameters of current point 752A.

While discussed above as using a single reference point in a single reference frame, the techniques of this disclosure are not so limited. As one example, multiple reference points in a single reference frame may collectively be used to predict the current point. For instance, G-PCC encoder 200 and G-PCC decoder 300 may determine, in a reference frame and based on a reference pivot point, a plurality of reference points. G-PCC encoder 200 and G-PCC decoder 300 may predict one or more parameters of a current point in a current frame based on the plurality of reference points. As another example, reference points from multiple reference frames may be used to predict the current point.

As discussed above, G-PCC encoder 200 and G-PCC decoder 300 may perform azimuth prediction. Let (r, phi, laserID) be the three coordinates of the pivot point (referred to as radius, azimuth and laser ID) in the spherical coordinate system. Techniques disclosed herein may also apply to other coordinate systems.

Figure 8:
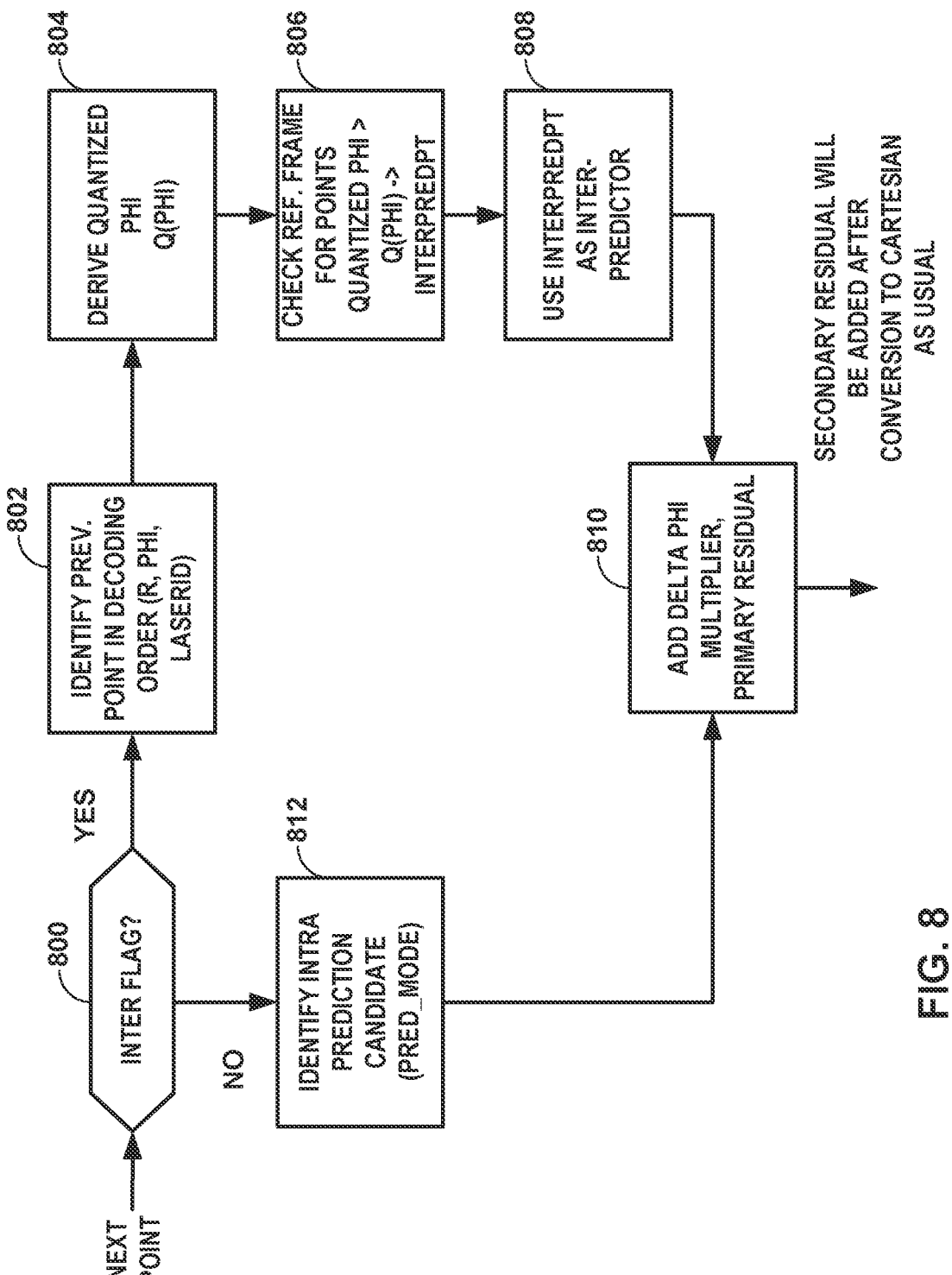
FIG. 8 is a flow diagram illustrating an example decoding flow associated with a syntax element indicating whether a node is coded in an inter prediction mode or an intra prediction mode.

FIG. 8 is a flowchart illustrating an example decoding flow associated with the "inter flag" that is signaled for every point. The inter flag signaled for a point indicates whether inter prediction is applied for the point. The flowcharts of this disclosure are provided as examples. Other examples may include more, fewer, or different steps, or steps may be performed in different orders.

In the example of FIG. 8, G-PCC decoder 300 may determine whether an inter flag of a next point to be decoded (i.e., a current point of a current frame of point cloud data) indicates that the current point is inter predicted (800). If the inter flag of the current point does not indicate that the current point is inter predicted ("NO" branch of 800), G-PCC decoder 300 may identify an intra prediction candidate (812). For instance, G-PCC decoder 300 may determine an intra prediction strategy (e.g., no prediction, delta prediction, linear prediction, parallelogram prediction, etc.) to determine a predictor for the current point. A syntax element (pred_mode) signaled in geometry bitstream 203 may indicate the intra prediction strategy to use to determine the predictor for the current point.

On the other hand, if the inter flag for the current point indicates that the current point is inter predicted ("YES" branch of 800), G-PCC decoder 300 may identify a previous point in decoding order (802). The previous point may have coordinates (r, phi, and laserID). G-PCC decoder 300 may then derive a quantized phi coordinate (i.e., azimuth coordinate) of the previous point (804). The quantized phi coordinate may be denoted as Q(phi). G-PCC decoder 300 may then check a reference frame for points (i.e., inter prediction points) having quantized phi coordinates greater than the quantized phi coordinate of the previous point (806). G-PCC decoder 300 may use the inter prediction point as a predictor for the current point (808).

Regardless of whether G-PCC decoder 300 determines the predictor for the current point using intra prediction (e.g., as described with respect to step 812) or using inter prediction (e.g., as described with respect to steps 802-808), G-PCC decoder 300 may add a delta phi multiplier (810).

G-PCC encoder 200 and G-PCC decoder 300 may be configured to use an additional predictor candidate. In the inter prediction process for predictive geometry labeled "Inter Prediction for Predictive Geometry Coding," the radius, azimuth and laserID of the current point are predicted based on a point that is near the collocated azimuth position in the reference frame when inter coding is applied.

Figure 9:
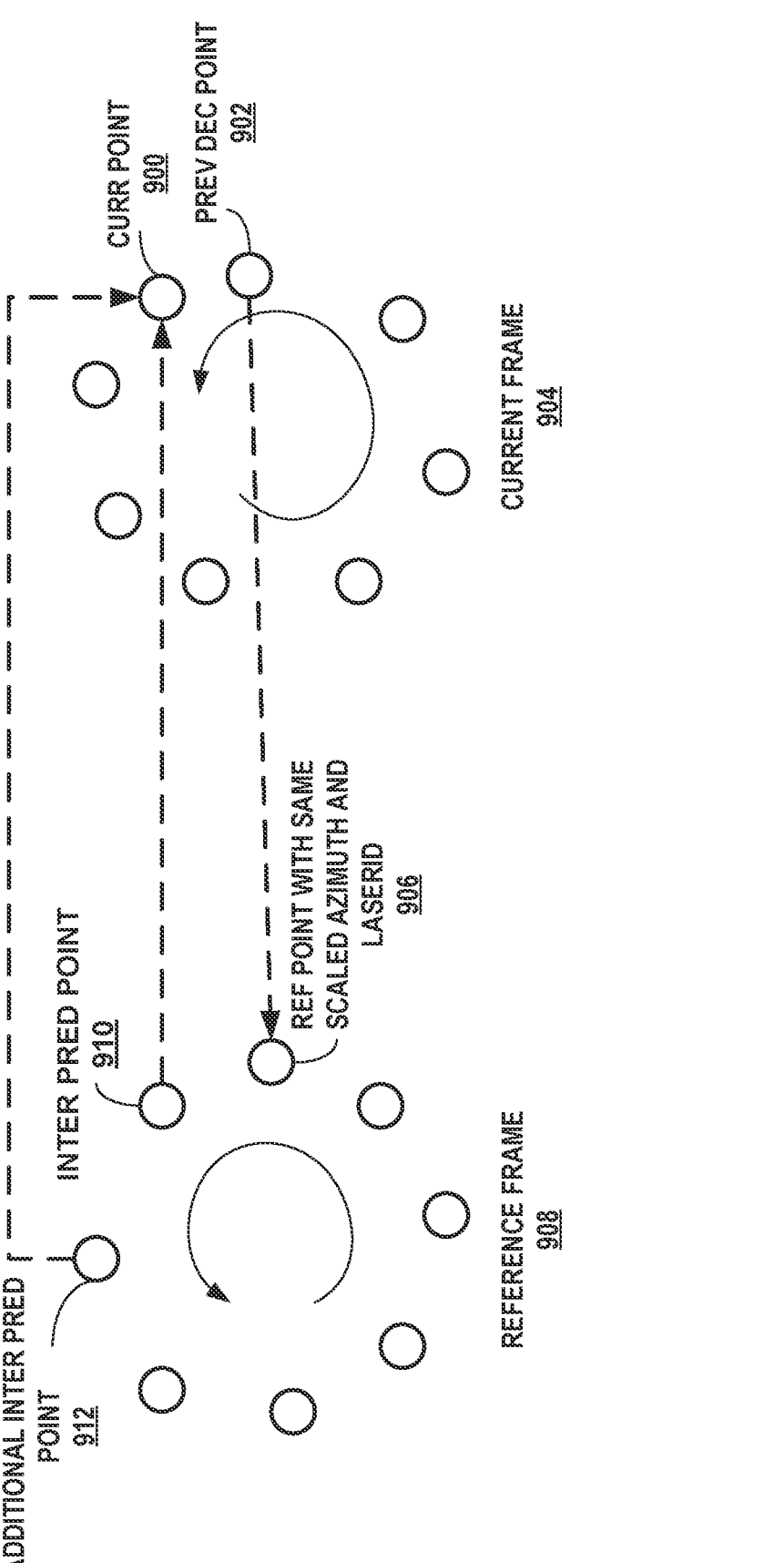
FIG. 9 is a conceptual diagram illustrating an additional inter predictor point obtained from the first point that has azimuth greater than the inter predictor point.

FIG. 9 is a conceptual diagram illustrating an example additional inter predictor point 900 obtained from the first point that has azimuth greater than an inter predictor point 914. In the inter prediction method for predictive geometry described above with respect to FIG. 7, the radius, azimuth and laserID of a current point are predicted based on a point that is near the collocated azimuth position in a reference frame when inter coding is applied. In the example of FIG. 9, G-PCC encoder 200 and G-PCC decoder 300 may determine additional inter predictor point 900 using the following steps:

a) for a given point (current point 900 of a current frame 904), determine a previous point 902 in current frame 904 ("prev dec point" in FIG. 9);

b) determine a reference position 906 in a reference frame 908 that has the same scaled azimuth and laserID as the previous point 904 determined in step a) ("ref point with same scaled azimuth and laserID" in FIG. 9), c) determine a position in reference frame 908 as the first point that has an azimuth (e.g., scaled azimuth) greater than the reference position 906 determined in step b), to be used as the inter predictor point (inter prediction point 910 in FIG. 9).

An additional inter predictor point may be obtained by finding the first point that has an azimuth (e.g., scaled azimuth) greater than inter prediction point 910 determined in step c) as shown in FIG. 9 ("additional inter prediction point 912" in FIG. 9). Additional signaling may be used to indicate which of the predictors is selected if inter coding has been applied. The additional inter predictor point may also be referred to as the "NextNext" inter predictor.

In some examples, G-PCC encoder 200 (e.g., arithmetic encoding unit 214 of G-PCC encoder 200) and G-PCC decoder 300 (e.g., geometry arithmetic decoding unit 302 of G-PCC decoder 300) may apply an improved context selection algorithm for coding the inter prediction flag. The inter prediction flag values of the five previously coded points may be used to select the context of the inter prediction flag in predictive geometry coding.

In predictive geometry coding, the residual value (derived based on the intra or inter predictor) may be coded using entropy coding. In many cases, there may be considerable correlation between the residual values of adjacent coded points; not utilizing this correlation may result in the use of a greater number of bits to code the positions of the point cloud. For instance, this disclosure describes techniques that use the correlation between residual values of adjacent coded points to code the positions of the point clouds, thus potentially reducing the number of bits used to code the positions.

One or more examples disclosed in this document may be applied independently or in a combined way. Although the discussion is predominantly on the polar coordinate system, processes disclosed in this application may also apply to other coordinate system such as Cartesian, spherical, or any custom coordinate system that may be used to represent/code the point cloud positions and attributes. In particular, GPCC utilizes the radius and azimuthal angle from the spherical coordinate system in combination with a laser identifier (cfr., elevation angle) from the Lidar sensor that captured the point.

G-PCC encoder 200 and G-PCC decoder 300 may be configured to signal a residual prediction indication. For example, G-PCC encoder 200 may signal a first value in the bitstream to indicate that residual prediction is applied on the residual of one or more components of a point.

Figure 10:
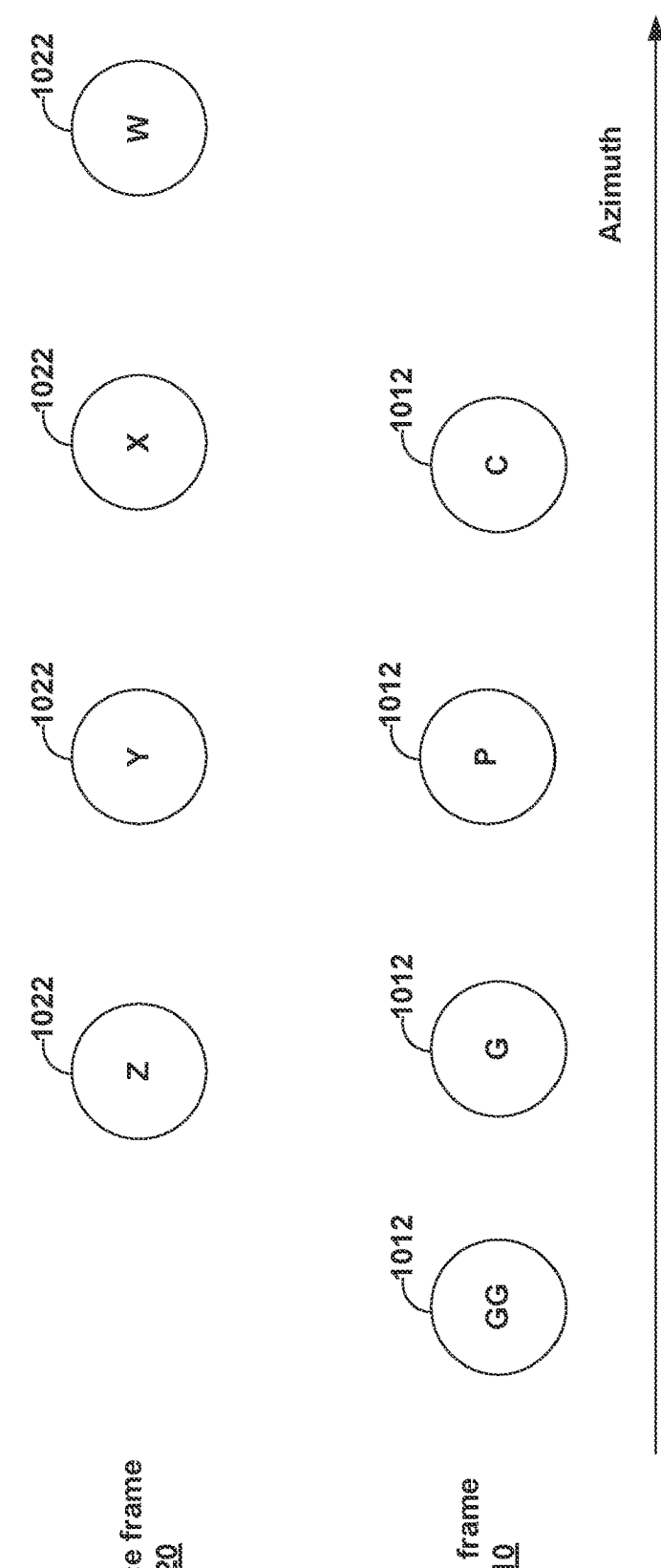
FIG. 10 is a conceptual diagram showing example points in a current frame and a reference frame in a point cloud.

FIG. 10 is a conceptual diagram showing example points in current frame 1010 and reference frame 1020 in a point cloud. This example may be used to illustrate various examples below; however, the processes disclosed may also apply to other examples.

Points 1012 belong to current frame 1010 and are labeled C, P, G, and GG. Points 1022 belong to reference frame 1020 and are labeled W, X, Y and Z. Points P, G and GG are the previous nodes in decoding order for the points C, P and G, respectively, and in some cases, may also be the parent nodes. Also, points X, Y and Z are nodes in reference frame 1020 that are collocated with nodes C, P and G, respectively. In this context, the term "collocated" should not be interpreted to imply an identical position, but instead means approximately collocated. For example, point X may have the same laser index as the point C and the difference between the azimuths of the X and C may be smaller than a threshold value (e.g., azimuth scaling value). In other words, based on an azimuth scale value, the quantized azimuth values of C, P and G are the same as that of X, Y and Z, respectively.

The intra predictor for point C may be one or more of the points P, G, GG or other points that are already coded in current frame 1010. In the inter predictor for point C may be point X (Next) or point W (NextNext).

Let pred_C denote the predictor value for the current point P. Similarly let resPred_C denote the residual predictor value for the current point. This discussion may apply to one component or may apply to more than one component. More information about the residual predictors is provided in the following subsections.

G-PCC encoder 200 may derive the residual value for point C as follows:

$$r\_res_c = r_C - r_{pred\_c}$$

The residual value of C that is coded (or "residual" residual) after subtracting the residual predictor is as follows:

$$r\_res_{coded\_c} = r\_res_c - r\_resPred_c$$

G-PCC decoder 300 may reconstruct the radius value for point C from the coded radius residual as follows:

$$r\_recon_c = r\_res_{coded\_c} + r\_resPred_c + r_{pred\_c}$$

G-PCC encoder 200 and G-PCC decoder 300 may be configured to utilize an intra residual predictor. Intra residual predictors are defined as predictors derived from previously coded points in the same frame. Some examples of intra residual predictors are provided below:

$$r\_resPred_c = r\_recon_P - r\_recon_G \qquad \text{Zeroth order predictor:}$$

$$r\_resPred_c = 2(r\_recon_P - r\_recon_G) - (r\_recon_G - r\_recon_{GG}) \qquad \text{First order predictor:}$$

$$r\_resPred_c = r\_recon_G - r\_recon_{GG} \qquad \text{Parallelogram predictor:}$$

The above equations show how the radius residual is obtained. Other components may also be similarly derived.

G-PCC encoder 200 and G-PCC decoder 300 may be configured to utilize an inter residual predictor. Inter residual predictors are defined as predictors derived from previously coded points in the reference frame(s). Some examples of inter residual predictors are provided below:

$$r\_resPred_c = r\_recon_X - r\_recon_Y \qquad \text{Zeroth order predictor:}$$

G-PCC encoder 200 and G-PCC decoder 300 may be configured to utilize a mixed residual predictor. Mixed residual predictors are defined as predictors derived from previously coded points in the current frame and previously coded points in the reference frame(s). Some examples of inter residual predictors are provided below:

$$r\_resPred_c = r\_recon_P - r\_recon_Y \qquad \text{Predictor A:}$$

$$r\_resPred_c = r\_recon_G - r\_recon_Z \qquad \text{Predictor B:}$$

$$r_{resPred_c} = 2(r_{recon_P} - r_{recon_Y}) - (r_{recon_G} - r_{recon_Z}) \qquad \text{Predictor C:}$$

G-PCC encoder 200 and G-PCC decoder 300 may be configured to signal a residual predictor indication. A first value is signaled to indicate that residual prediction is enabled. For example, a flag may be signaled to indicate that residual prediction is enabled for a point.

When more than one residual predictor is available for a given point, a second value may be signaled to indicate the particular residual predictor to be used to code the given point. For example, when there are two residual predictors resPred1 and resPred2 that may be used for a point, a second value may be signaled as a 1-bit number, where the second value of 0 indicates that resPred1 is used for residual prediction, and the second value of 1 indicates that resPred2 is used for residual prediction.

In some examples, G-PCC encoder 200 and G-PCC decoder 300 may be configured to derive the particular residual predictor for a point from other syntax elements that may be signaled associated with the point.

For example, when the point is intra coded, G-PCC encoder 200 and G-PCC decoder 300 may use an intra residual prediction (e.g., the zeroth order intra residual predictor), and when the point is inter coded, G-PCC encoder 200 and G-PCC decoder 300 may use a mixed residual predictor (e.g., Predictor A). For example, when the point is intra coded, G-PCC encoder 200 and G-PCC decoder 300 may use an inter residual prediction (e.g., the zeroth order inter residual predictor), and when the point is inter coded, G-PCC encoder 200 and G-PCC decoder 300 may use a mixed residual predictor (e.g., Predictor A).

In some examples, G-PCC encoder 200 may signal the first value only for certain prediction modes. For other prediction modes, G-PCC encoder 200 may not signal the first value, and G-PCC decoder 300 may infer that residual prediction is not applied to the point. For example, when a point is intra predicted, the first value may only be signaled for points that are coded that use P as their predictor. For other intra predictors, the first value is not signaled. In another example, when a point is inter predicted, the first value is signaled only for points that are predicted with the Next predictor; for other inter predictors, the first value is not signaled.

In a first example implementation, G-PCC encoder 200 and G-PCC decoder 300 may apply residual prediction to a point in order to improve the coding efficiency. For a given point, G-PCC encoder 200 may signal a flag (first value) to indicate whether residual prediction is applied to the point. If residual prediction is applied, G-PCC encoder 200 may determine the coded residual or "residual" residual using the residual predictor. G-PCC decoder 300 may obtain the residual using the residual predictor and the decoded "residual" residual. In this example, the residual predictor may be fixed (e.g., always use the zeroth order intra residual predictor).

Figures 11A, 11B:
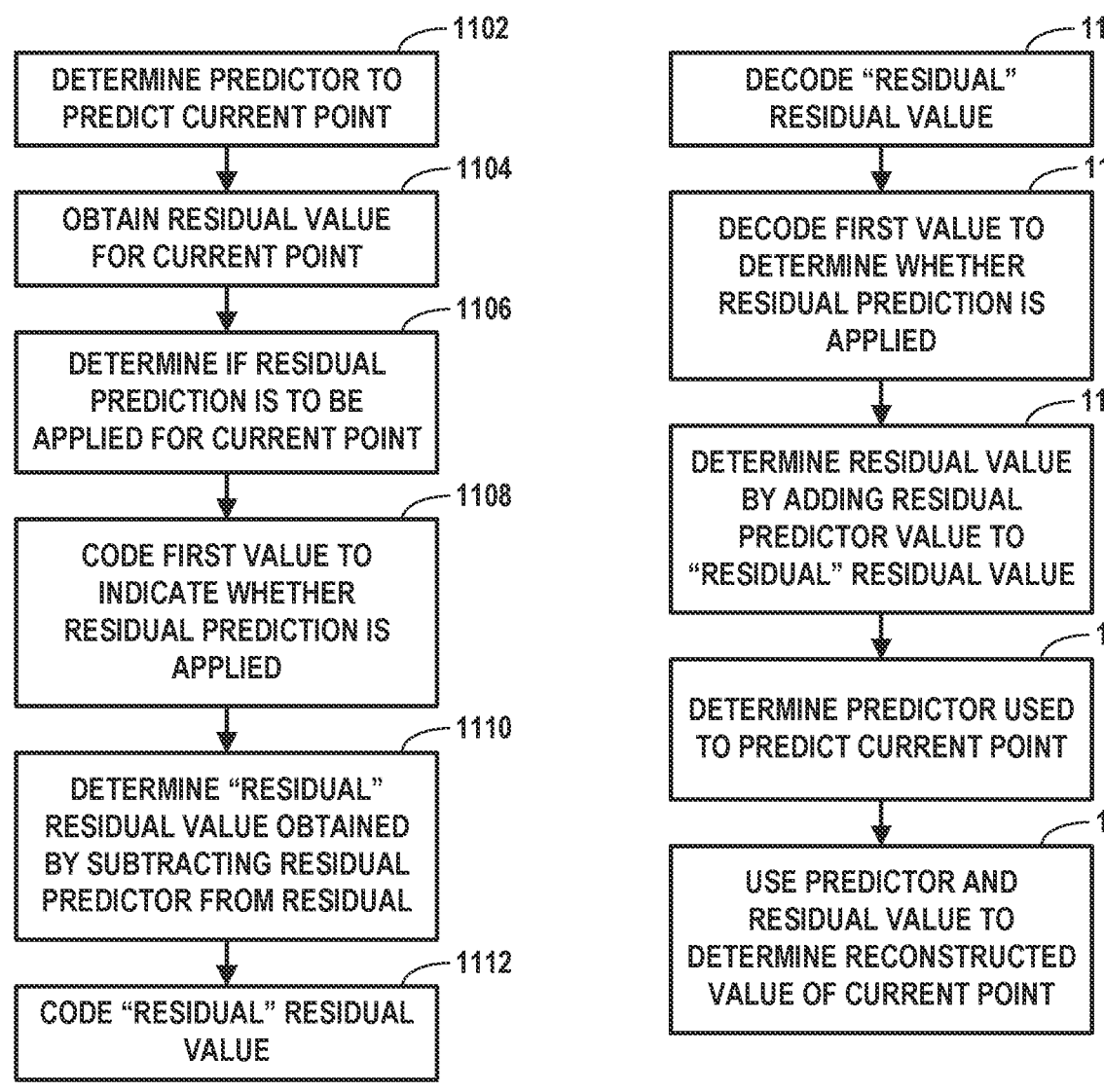
FIG. 11A shows an example process of how a G-PCC encoder may use residual prediction to encode a point position.
FIG. 11B shows an example process of how a G-PCC decoder may use residual prediction to decode the point position encoded by the process of FIG. 11A.

FIG. 11A shows an example process, performed by G-PCC encoder 200, for using residual prediction to encode a point position. In the example of FIG. 11A, G-PCC encoder 200 determines predictor to predict current point (1102); obtains residual value for current point (1104); determines if residual prediction is to be applied for current point (1106); codes a first value to indicate whether residual prediction is applied (1108); determines a "residual" residual value obtained by subtracting residual predictor from residual (1110); and codes the "residual" residual value (1112).

FIG. 11B shows an example process, performed by G-PCC decoder 300, for using residual prediction to decode the point position encoded by the process of FIG. 11A. Note that some of the steps may be re-ordered. In the example of FIG. 11B, G-PCC decoder 300 decodes "residual" residual value (1120); decodes a first value to determine whether residual prediction is applied (1122); determines a residual value by adding a residual predictor value to the "residual" residual value (1124); determines a predictor used to predict a current point (1126); and uses the predictor and the residual value to determine reconstructed value of the current point (1128).

In a second example implementation, G-PCC encoder 200 and G-PCC decoder 300 may be configured to apply residual prediction to a point in order to improve the coding efficiency. For a given point, G-PCC encoder 200 may signal a flag (first value) to indicate whether residual prediction is applied to the point. If residual prediction is applied, G-PCC encoder 200 may signal a second value (residual prediction mode) for determining the residual predictor value. G-PCC encoder 200 may determine the coded residual or "residual" residual using the residual predictor. G-PCC decoder 300 may obtain the residual using the residual predictor and decoded "residual" residual.

Figures 12A, 12B:
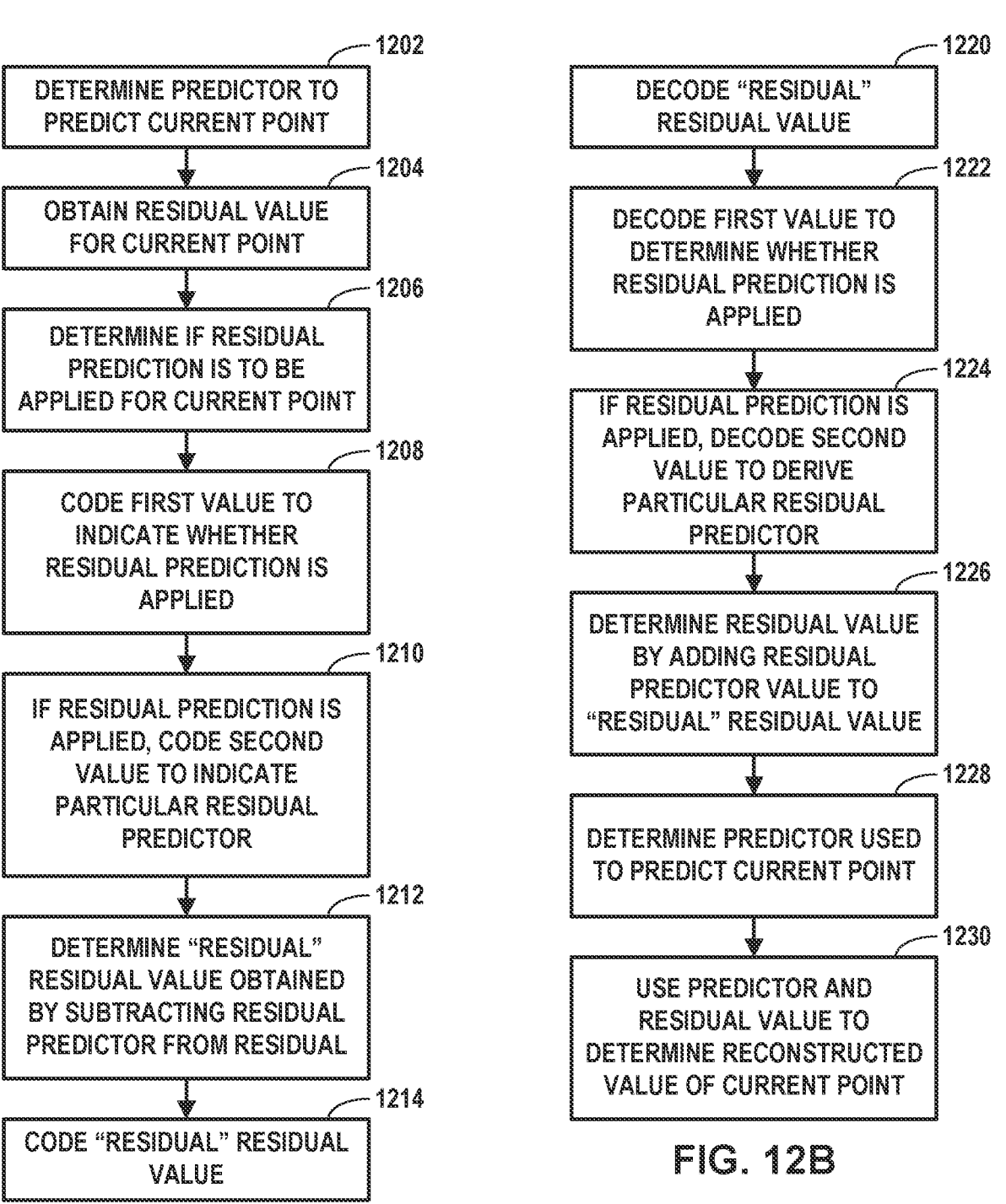
FIG. 12A shows an example process of how a G-PCC encoder may use residual prediction to encode a point position.
FIG. 12B shows an example process of how a G-PCC decoder may use residual prediction to decode the point position encoded by the process of FIG. 12A.

FIG. 12A shows an example process, performed by G-PCC encoder 200, for using residual prediction to encode a point position. In the example of FIG. 12A, G-PCC encoder 200 determines a predictor to predict a current point (1202); obtains a residual value for the current point (1204); determines if residual prediction is to be applied for the current point (1206); codes a first value to indicate whether residual prediction is applied (1208); codes a second value to indicate a particular residual predictor if residual prediction is applied (1210); determines a "residual" residual value obtained by subtracting the residual predictor from the residual (1212); and codes the "residual" residual value (1214).

FIG. 12B shows an example process, performed by G-PCC decoder 300, for using residual prediction to decode the point position encoded by the process of FIG. 12A. In the example of FIG. 12B, G-PCC decoder 300 decodes a "residual" residual value (1220); decodes a first value to determine whether residual prediction is applied (1222); decodes a second value to derive a particular residual predictor if residual prediction is applied (1224); determines a residual value by adding the residual predictor value to the "residual" residual value (1226); determines a predictor used to predict the current point (1228); and uses the predictor and the residual value to determine a reconstructed value of the current point (1230).

In a third example implementation, G-PCC encoder 200 and G-PCC decoder 300 may be configured to apply residual prediction to a point in order to improve the coding efficiency. For a given point, G-PCC encoder 200 may signal a flag (first value) to indicate whether residual prediction is applied to the point. If residual prediction is applied, then G-PCC decoder 300 determines the residual predictor mode based on other syntax elements (e.g., inter prediction flag and/or prediction mode value), or more generally, on a second set of conditions. For example, when the inter prediction flag is 0 (i.e., point is intra coded), G-PCC decoder 300 may be configured to select the zeroth order intra residual predictor and when the inter prediction flag is 1 (i.e., the point is inter coded), G-PCC decoder 300 may be configured to select Predictor A as the residual predictor. G-PCC encoder 200 determines the coded residual or "residual" residual using the residual predictor, G-PCC decoder 300 determines the residual using the residual predictor and decoded "residual" residual.

A fourth example implementation is similar to the third example implementation above but with the difference that the residual prediction is not enabled for all points in the current frame and is, instead, determined based on other syntax elements (e.g., inter prediction flag and/or prediction mode value). In this example, G-PCC encoder 200 and G-PCC decoder 300 may be configured to apply residual prediction to a point in order to improve the coding efficiency. For a given point, G-PCC encoder 200 may signal a flag (first value) to indicate whether residual prediction is applied to the point if one of the following two cases is true or, more generally, if a first set of conditions are true. A first example set of conditions may include the point being coded with intra prediction and the delta predictor (i.e., when predictor is point P) being the predictor used. Another example set of conditions is the point being coded with inter prediction and the Next predictor being used for inter prediction.

In some example cases, G-PCC decoder 300 may be configured to derive, without signaling, the first value and that residual prediction is not applied. If residual prediction is applied, then G-PCC decoder 300 may be configured to determine the residual predictor based on other syntax elements (e.g., inter prediction flag), or a second set of conditions. For example, when inter prediction flag is 0 (i.e., point is intra coded), G-PCC decoder 300 may be configured to select the zeroth order intra residual predictor and when inter prediction flag is 1 (i.e., the point is inter coded), G-PCC decoder 300 may select Predictor A as the residual predictor. G-PCC encoder 200 determines the coded residual or "residual" residual using the residual predictor, and G-PCC decoder 300 determines the residual using the residual predictor and decoded "residual" residual.

Figures 13A, 13B:
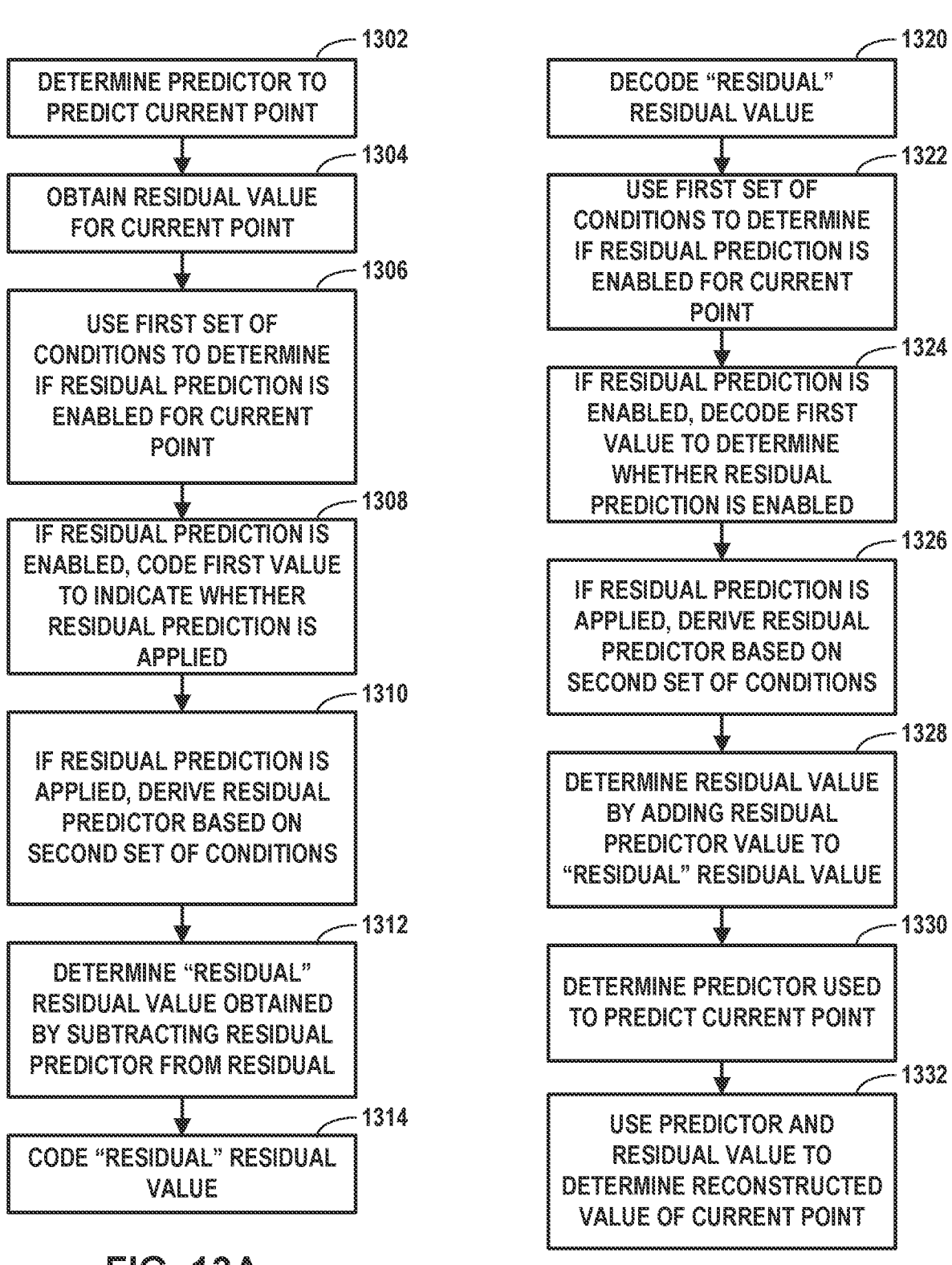
FIG. 13A shows an example process of how a G-PCC encoder may use residual prediction to encode a point position.
FIG. 13B shows an example process of how a G-PCC decoder may residual prediction is used to decode the point position encoded by the process of FIG. 13A.

FIG. 13A shows an example process, performed by G-PCC encoder 200, for using residual prediction to encode a point position. In the example of FIG. 13A, G-PCC encoder 200 determines a predictor to predict a current point (1302); obtains a residual value for the current point (1304);

uses a first set of conditions to determine if residual prediction is enabled for the current point (1306); codes a first value to indicate whether residual prediction is applied if residual prediction is enabled (1308); derives a residual predictor based on a second set of conditions if residual prediction is applied (1310); determines a "residual" residual value obtained by subtracting the residual predictor from the residual (1312); and codes the "residual" residual value (1314).

FIG. 13B shows an example process, performed by G-PCC decoder 300, for using residual prediction to decode the point position encoded by the process of FIG. 13A. In the example of FIG. 13B, G-PCC decoder 300 decodes a "residual" residual value (1320); uses first set of conditions to determine if residual prediction is enabled for a current point (1322); decodes a first value to determine whether residual prediction is enabled if residual prediction is enabled (1324); derives a residual predictor based on a second set of conditions if residual prediction is applied (1326); determines a residual value by adding the residual predictor value to the "residual" residual value (1328); determine a predictor used to predict a current point (1330); and uses the predictor and the residual value to determine a reconstructed value of the current point (1332).

In some examples, G-PCC encoder 200 and G-PCC decoder 300 may be configured to only apply residual prediction to inter predicted points.

Figure 14A:
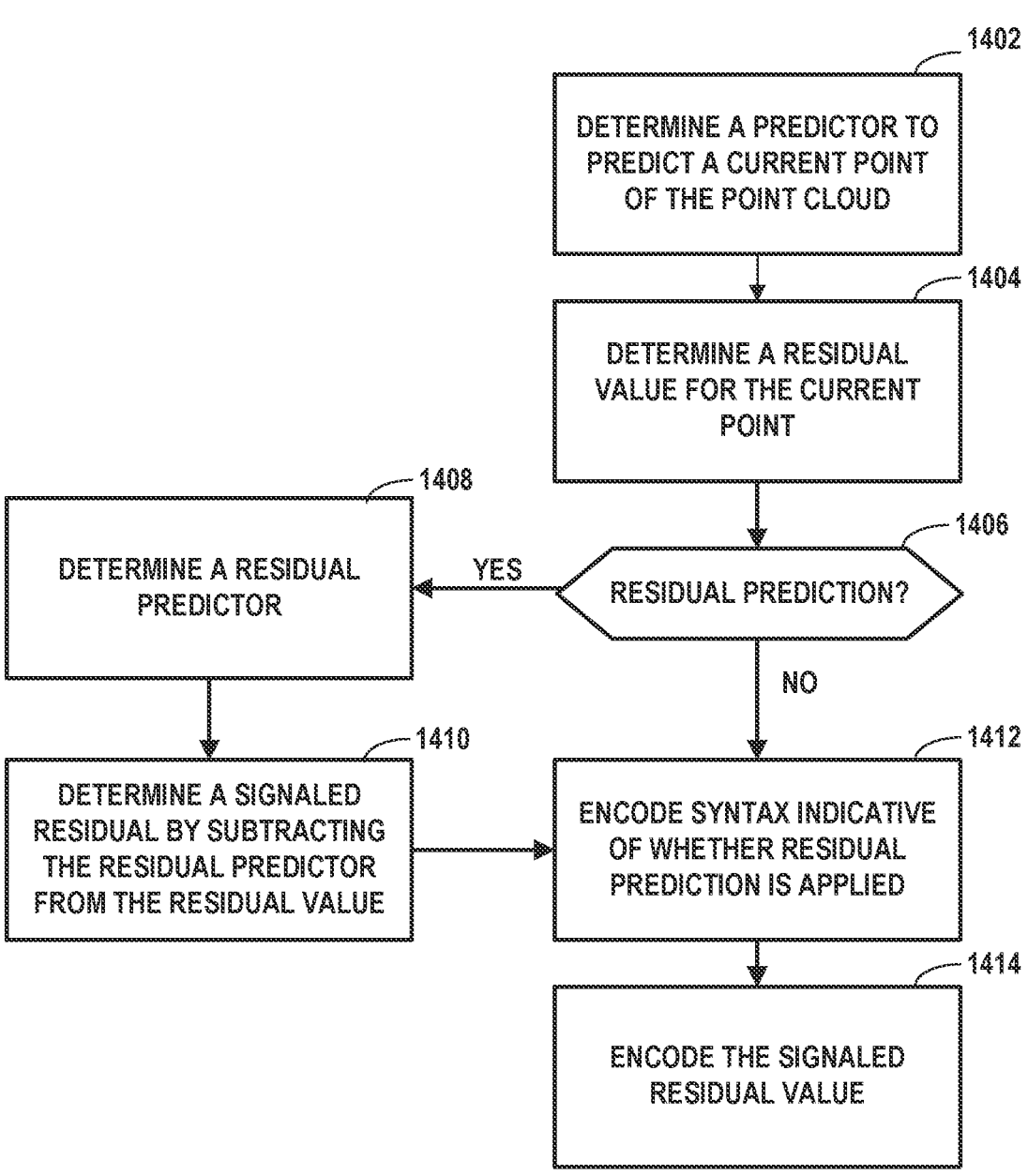
FIG. 14A shows an example process of how a G-PCC encoder may use residual prediction to encode a point position.

FIG. 14A shows an example process, performed by G-PCC encoder 200, for using residual prediction to encode a point position. In the example of FIG. 14A, G-PCC encoder 200 determines a predictor to predict a current point of the point cloud (1402) and determines a residual value for the current point (1404). The residual value represents a difference between the value of the predictor for the current point and the original, or actual, value for the unencoded current point.

G-PCC encoder 200 determines whether residual prediction is to be applied for the current point (1406). In response to determining that residual prediction is to be applied (1406, YES), G-PCC encoder 200 determines a residual predictor (1408) and determines a signaled residual value by subtracting a residual predictor from the residual value for the current point (1410). In response to determining that residual prediction is not applied (1406, NO), G-PCC encoder 200 may use the residual value determined at block 1404 as the signaled residual value.

Regardless of whether residual prediction is used or not, G-PCC encoder 200 may encode syntax indicative of whether residual prediction is applied for the current point (1412). In some examples, the syntax indicative of whether residual prediction is applied for the current point may be a dedicated a 1-bit flag, wherein a first value indicates residual prediction is applied and a second value indicates residual prediction is not applied. In some examples, the syntax indicative of whether residual prediction is applied may include syntax signal for other purposes, such as syntax indicating intra- or inter-prediction modes.

G-PCC encoder 200 encodes the signaled residual value (1414). As explained above, if residual prediction is applied, then the signaled residual value may be set equal to the residual value determined at block 1404 minus the residual predictor determined at block 1408. If residual prediction is not used, then the signaled residual value may equal residual value determined at block 1404.

Figure 14B:
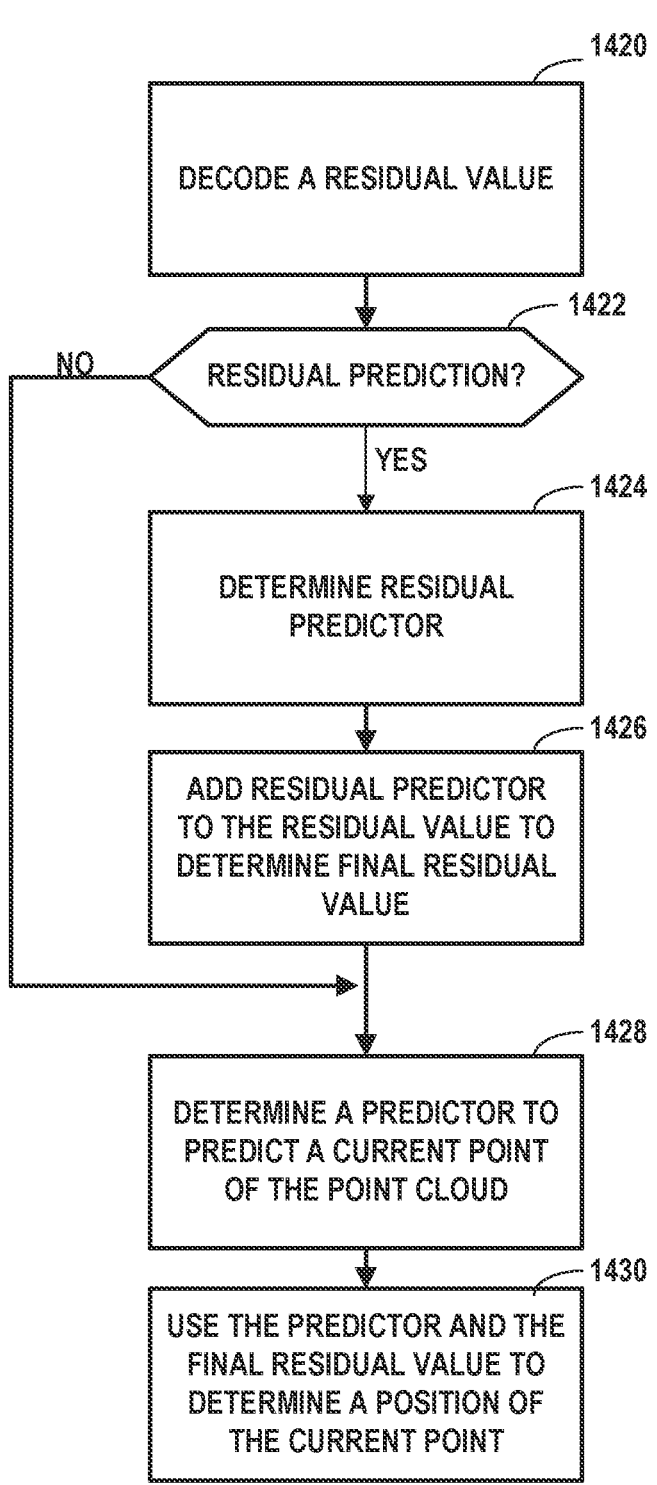
FIG. 14B shows an example process of how a G-PCC decoder may residual prediction is used to decode the point position encoded by the process of FIG. 14A.

FIG. 14B shows an example process, performed by G-PCC decoder 300, for using residual prediction to decode the point position encoded by the process of FIG. 14A. In the example of FIG. 14B, G-PCC decoder 300 decodes a residual value (1420). G-PCC decoder also 300 determines whether residual prediction is applied (1422). If residual prediction is not applied (1422, NO), then G-PCC decoder 300 may use decoded residual value as the final residual value. If residual prediction is applied (1422, YES), then the decoded residual value may not be the final residual value.

G-PCC decoder 300 may determine that the residual prediction is applied in response to determining that the current point is coded in an intra prediction mode and in response to determining that the predictor used to predict the current point is a delta predictor. The delta predictor may, for example, be a previously coded point in decoding order, such as the preceding node in decoding order or the parent node.

G-PCC decoder 300 may determine that residual prediction is applied in response to determining that the current point is coded in an inter prediction mode and in response to determining that a next predictor is used for inter prediction. For example, G-PCC decoder 300 may select a first position of a point previously coded in the current point is chosen and derive a first scaled value of azimuth for the first position. G-PCC decoder 300 may select a second position in the reference frame that has the same scaled azimuth value as the first scaled value and a laser ID equal to the laser ID of the first position. G-PCC decoder 300 may locate a second point, if any, in the reference frame that has a second scaled azimuth value greater than the first scaled azimuth value and determine if there is no other point in the reference frame that has a scaled azimuth value greater than first scaled azimuth value and less than second scaled azimuth value. If present, this second point is considered the next predictor. G-PCC decoder 300 may locate a third point, if any, in the reference frame that has a third scaled azimuth value greater than the second scaled azimuth value and determine if there is no other point in the reference frame that has scaled azimuth value greater than second scaled azimuth value and less than the third scaled azimuth value. If present, this third point is considered the next next predictor.

In response to determining that residual prediction is applied (1422, YES), G-PCC decoder 300 determines a residual predictor (1424) and adds the residual predictor to the residual value to determine a final residual value (1426). As described above, G-PCC decoder 300 may determine the residual predictor based on one or more points in a same frame as the current point, one or more points in a reference frame for the current point, or based on one or more first points in a reference frame for the current point and based on one or more second points in a same frame as the current point.

Regardless of whether residual prediction is applied or not, G-PCC decoder 300 may determine a predictor used to predict a current point of the point cloud (1428) and use the predictor and the final residual value to determine a position of the current point (1430). If residual prediction is not applied (1422, NO), then G-PCC decoder 300 may, for example, add the predictor and the decoded residual value to determine the position, with the decoded residual value corresponding to the final residual value. If residual prediction is applied (1422, YES), then G-PCC decoder 300 may, for example, add the predictor, the residual predictor, and the decoded residual value to determine the position, with the combination of the residual predictor and the decoded residual value corresponding to the final residual value. G-PCC decoder 300 may, for example, use the predictor and the final residual value to determine a radius for the current point. Using the determined position and other decoded data, G-PCC decoder 300 may reconstruct the point cloud.

Although the processes of FIGS. 11A, 12A, 13A, and 14A were described with respect to G-PCC encoder 200, it should be understand that other types of G-PCC encoders may also perform these processes. Similarly, although the processes of FIGS. 11B, 12B, 13B, and 14B were described with respect to G-PCC decoder 300, it should be understand that other types of G-PCC decoders may also perform these processes. Additionally, G-PCC encoders may be configured to perform the processes of FIGS. 11B, 12B, 13B, and 14B as part of performing encoding processes.

Figure 15:
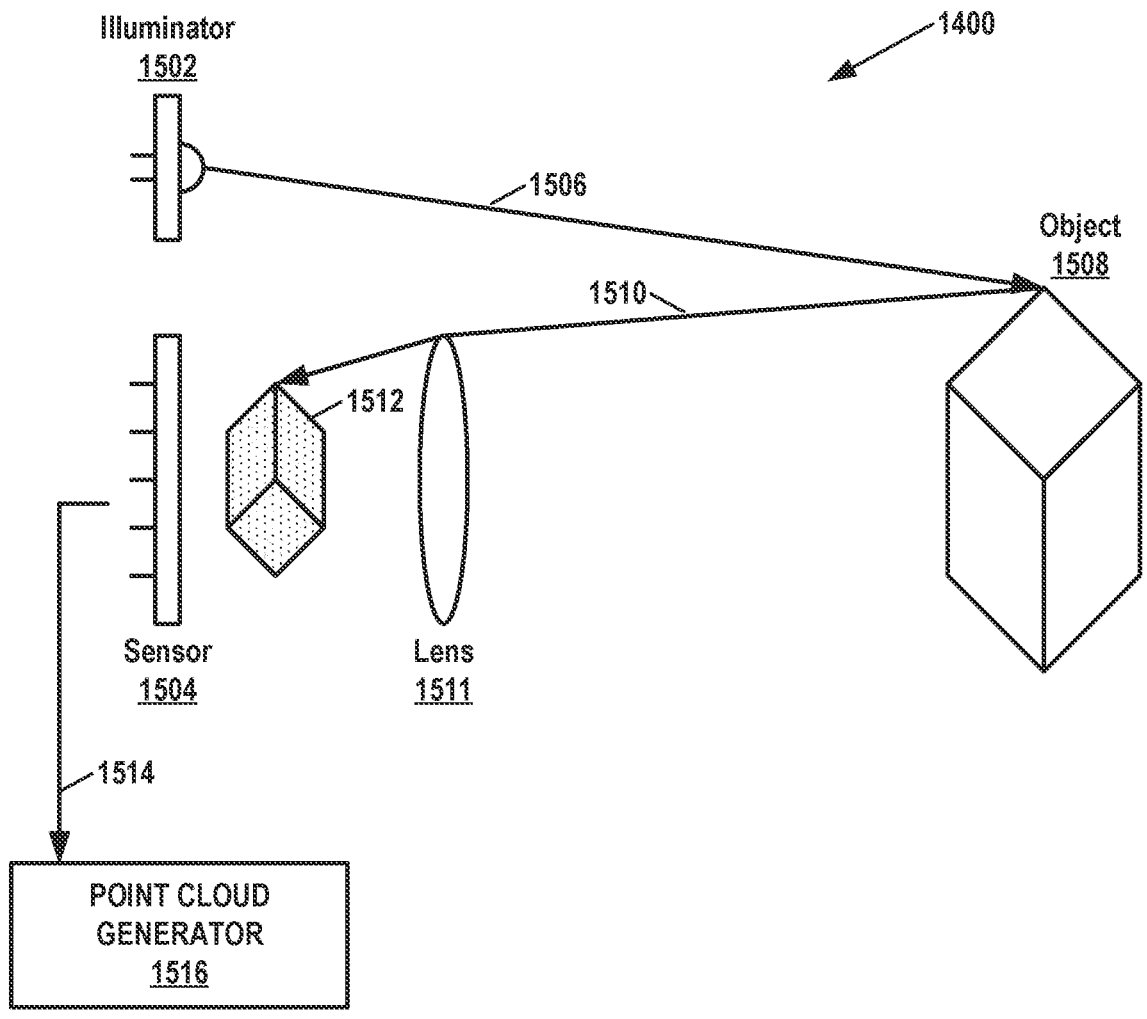
FIG. 15 is a conceptual diagram illustrating an example range-finding system that may be used with one or more techniques of this disclosure.

FIG. 15 is a conceptual diagram illustrating an example range-finding system 1500 that may be used with one or more techniques of this disclosure. In the example of FIG. 15, range-finding system 1500 includes an illuminator 1502 and a sensor 1504. Illuminator 1502 may emit light 1506. In some examples, illuminator 1502 may emit light 1506 as one or more laser beams. Light 1506 may be in one or more wavelengths, such as an infrared wavelength or a visible light wavelength. In other examples, light 1506 is not a coherent, laser light. When light 1506 encounters an object, such as object 1508, light 1506 creates returning light 1510. Returning light 1510 may include backscattered and/or reflected light. Returning light 1510 may pass through a lens 1511 that directs returning light 1510 to create an image 1512 of object 1508 on sensor 1504. Sensor 1504 generates signals 1514 based on image 1512. Image 1512 may comprise a set of points (e.g., as represented by dots in image 1512 of FIG. 15).

In some examples, illuminator 1502 and sensor 1504 may be mounted on a spinning structure so that illuminator 1502 and sensor 1504 capture a 360-degree view of an environment. In other examples, range-finding system 1500 may include one or more optical components (e.g., mirrors, collimators, diffraction gratings, etc.) that enable illuminator 1502 and sensor 1504 to detect ranges of objects within a specific range (e.g., up to 360-degrees). Although the example of FIG. 15 only shows a single illuminator 1502 and sensor 1504, range-finding system 1500 may include multiple sets of illuminators and sensors.

In some examples, illuminator 1502 generates a structured light pattern. In such examples, range-finding system 1500 may include multiple sensors 1504 upon which respective images of the structured light pattern are formed. Range-finding system 1500 may use disparities between the images of the structured light pattern to determine a distance to an object 1508 from which the structured light pattern backscatters. Structured light-based range-finding systems may have a high level of accuracy (e.g., accuracy in the sub-millimeter range), when object 1508 is relatively close to sensor 1504 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 1500 is a time of flight (ToF)-based system. In some examples where range-finding system 1500 is a ToF-based system, illuminator 1502 generates pulses of light. In other words, illuminator 1502 may modulate the amplitude of emitted light 1506. In such examples, sensor 1504 detects returning light 1510 from the pulses of light 1506 generated by illuminator 1502. Range-finding system 1500 may then determine a distance to object 1508 from which light 1506 backscatters based on a delay between when light 1506 was emitted and detected and the known speed of light in air). In some examples, rather than (or in addition to) modulating the amplitude of the emitted light 1506, illuminator 1502 may modulate the phase of the emitted light 1506. In such examples, sensor 1504 may detect the phase of returning light 1510 from object 1508 and determine distances to points on object 1508 using the speed of light and based on time differences between when illuminator 1502 generated light 1506 at a specific phase and when sensor 1504 detected returning light 1510 at the specific phase.

In other examples, a point cloud may be generated without using illuminator 1502. For instance, in some examples, sensors 1504 of range-finding system 1500 may include two or more optical cameras. In such examples, range-finding system 1500 may use the optical cameras to capture stereo images of the environment, including object 1508. Range-finding system 1500 may include a point cloud generator 1516 that may calculate the disparities between locations in the stereo images. Range-finding system 1500 may then use the disparities to determine distances to the locations shown in the stereo images. From these distances, point cloud generator 1516 may generate a point cloud.

Sensors 1504 may also detect other attributes of object 1508, such as color and reflectance information. In the example of FIG. 15, a point cloud generator 1516 may generate a point cloud based on signals 1514 generated by sensor 1504. Range-finding system 1500 and/or point cloud generator 1516 may form part of data source 104 (FIG. 1). Hence, a point cloud generated by range-finding system 1500 may be encoded and/or decoded according to any of the techniques of this disclosure.

Figure 16:
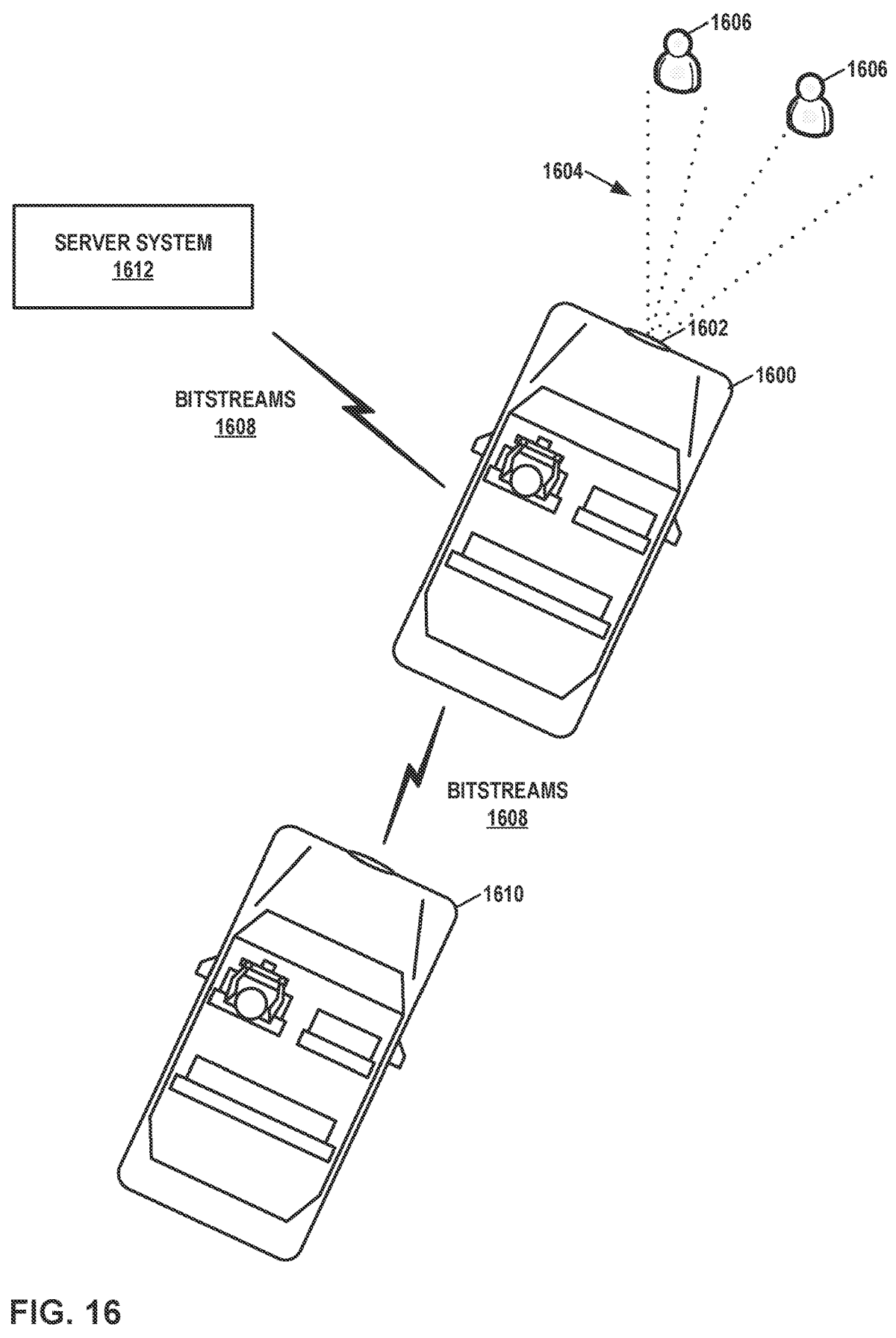

FIG. 16 is a conceptual diagram illustrating an example vehicle-based scenario in which one or more techniques of this disclosure may be used. In the example of FIG. 16, a vehicle 1600 includes a range-finding system 1602. Range-finding system 1602 may be implemented in the manner discussed with respect to FIG. 16. Although not shown in the example of FIG. 16, vehicle 1600 may also include a data source, such as data source 104 (FIG. 1), and a G-PCC encoder, such as G-PCC encoder 200 (FIG. 1). In the example of FIG. 16, range-finding system 1602 emits laser beams 1604 that reflect off pedestrians 1606 or other objects in a roadway. The data source of vehicle 1600 may generate a point cloud based on signals generated by range-finding system 1602. The G-PCC encoder of vehicle 1600 may encode the point cloud to generate bitstreams 1608, such as geometry bitstream (FIG. 2) and attribute bitstream (FIG. 2). Bitstreams 1608 may include many fewer bits than the unencoded point cloud obtained by the G-PCC encoder. In some examples, the G-PCC encoder of vehicle 1600 may encode the bitstreams 1608 using radius interpolation as described above. In some examples, the G-PCC decoder of vehicle 1610 may decode the bitstreams 1608 using radius interpolation as described above.

An output interface of vehicle 1600 (e.g., output interface 108 (FIG. 1) may transmit bitstreams 1608 to one or more other devices. Bitstreams 1608 may include many fewer bits than the unencoded point cloud obtained by the G-PCC encoder. Thus, vehicle 1600 may be able to transmit bitstreams 1608 to other devices more quickly than the unencoded point cloud data. Additionally, bitstreams 1608 may require less data storage capacity.

In the example of FIG. 16, vehicle 1600 may transmit bitstreams 1608 to another vehicle 1610. Vehicle 1610 may include a G-PCC decoder, such as G-PCC decoder 300 (FIG. 1). The G-PCC decoder of vehicle 1610 may decode bitstreams 1608 to reconstruct the point cloud. Vehicle 1610 may use the reconstructed point cloud for various purposes. For instance, vehicle 1610 may determine based on the reconstructed point cloud that pedestrians 1606 are in the roadway ahead of vehicle 1600 and therefore start slowing down, e.g., even before a driver of vehicle 1610 realizes that pedestrians 1006 are in the roadway. Thus, in some examples, vehicle 1610 may perform an autonomous navigation operation based on the reconstructed point cloud.

Additionally, or alternatively, vehicle 1600 may transmit bitstreams 1608 to a server system 1612. Server system 1612 may use bitstreams 1608 for various purposes. For example, server system 1612 may store bitstreams 1608 for subsequent reconstruction of the point clouds. In this example, server system 1612 may use the point clouds along with other data (e.g., vehicle telemetry data generated by vehicle 1600) to train an autonomous driving system. In other example, server system 1612 may store bitstreams 1608 for subsequent reconstruction for forensic crash investigations.

Figure 17:
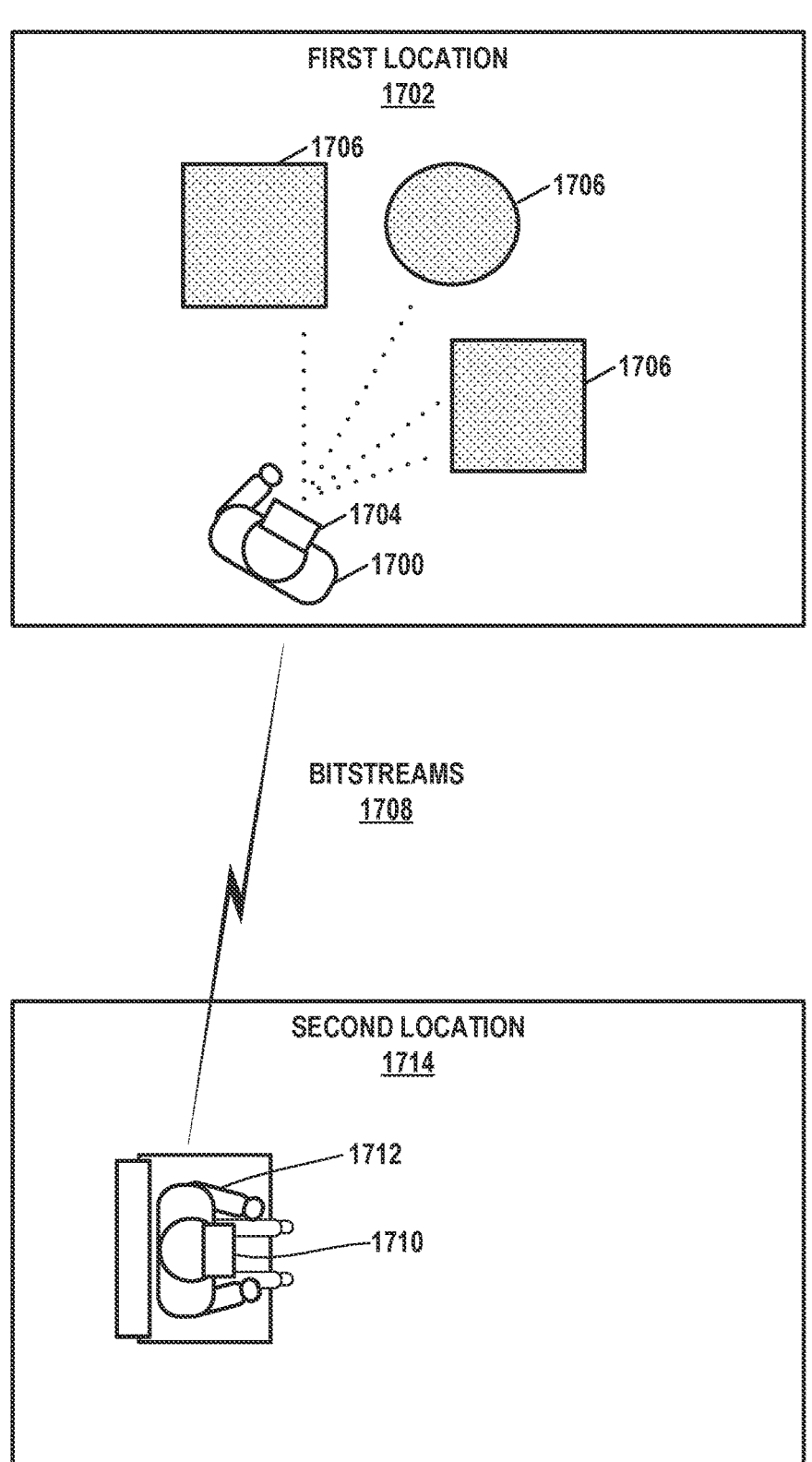
FIG. 17 is a conceptual diagram illustrating an example extended reality system in which one or more techniques of this disclosure may be used.

FIG. 17 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 17, a user 1700 is located in a first location 1702. User 1700 wears an XR headset 1704. As an alternative to XR headset 1704, user 1700 may use a mobile device (e.g., mobile phone, tablet computer, etc.). XR headset 1704 includes a depth detection sensor, such as a range-finding system, that detects positions of points on objects 1706 at location 1702. A data source of XR headset 1704 may use the signals generated by the depth detection sensor to generate a point cloud representation of objects 1706 at location 1702. XR headset 1704 may include a G-PCC encoder (e.g., G-PCC encoder 200 of FIG. 1) that is configured to encode the point cloud to generate bitstreams 1708. In some examples, the G-PCC encoder of XR headset 1704 may use radius interpolation when encoding the point cloud, as described above.

XR headset 1704 may transmit bitstreams 1708 (e.g., via a network such as the Internet) to an XR headset 1710 worn by a user 1712 at a second location 1714. XR headset 1710 may decode bitstreams 1708 to reconstruct the point cloud. In some examples, the G-PCC decoder of XR headset 1710 may use radius interpolation when decoding the point cloud, as described above.

XR headset 1710 may use the point cloud to generate an XR visualization (e.g., an AR, MR, VR visualization) representing objects 1706 at location 1702. Thus, in some examples, such as when XR headset 1710 generates an VR visualization, user 1712 may have a 3D immersive experience of location 1702. In some examples, XR headset 1710 may determine a position of a virtual object based on the reconstructed point cloud. For instance, XR headset 1710 may determine, based on the reconstructed point cloud, that an environment (e.g., location 1702) includes a flat surface and then determine that a virtual object (e.g., a cartoon character) is to be positioned on the flat surface. XR headset 1710 may generate an XR visualization in which the virtual object is at the determined position. For instance, XR headset 1710 may show the cartoon character sitting on the flat surface.

Figure 18:
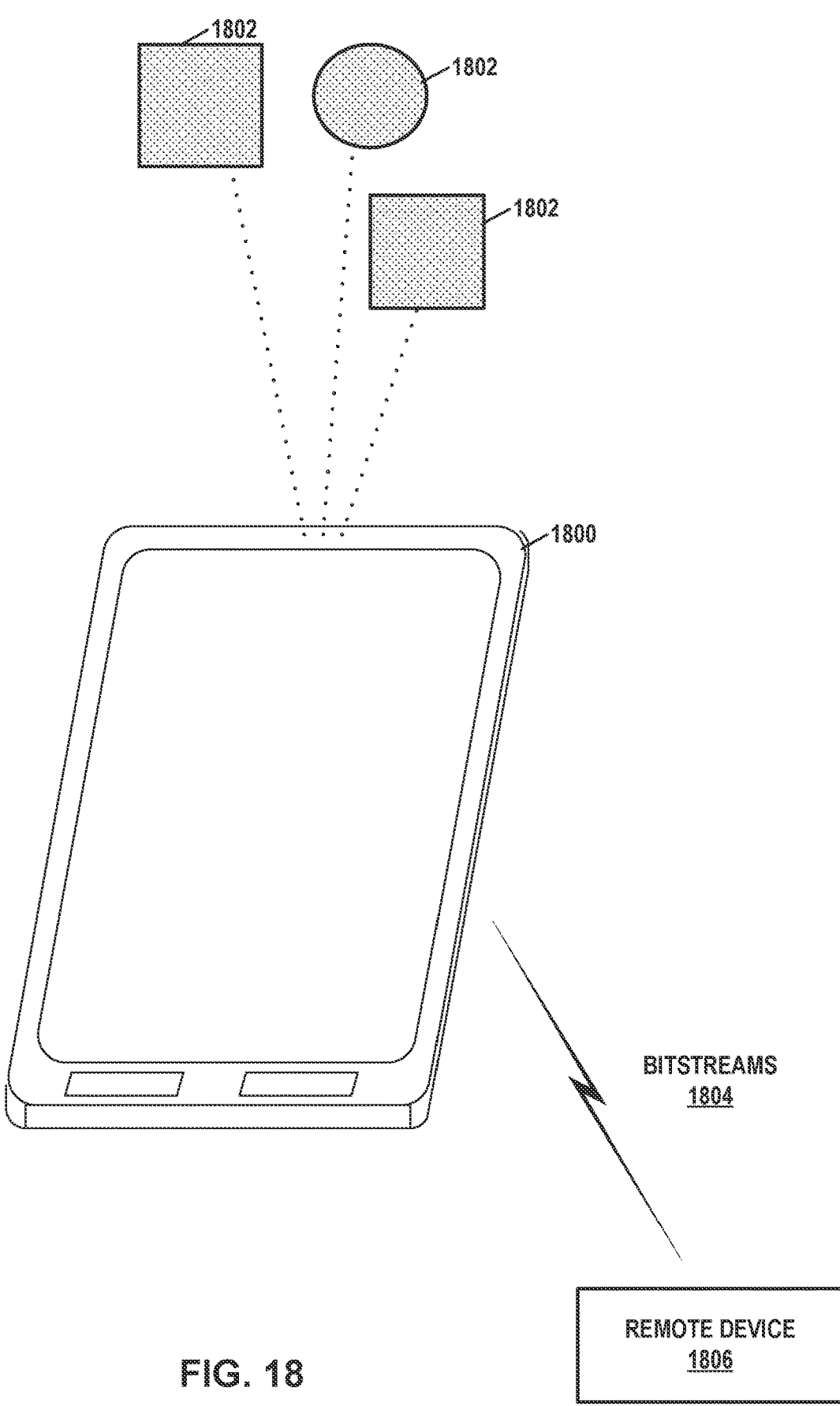
FIG. 18 is a conceptual diagram illustrating an example mobile device system in which one or more techniques of this disclosure may be used.

FIG. 18 is a conceptual diagram illustrating an example mobile device system in which one or more techniques of this disclosure may be used. In the example of FIG. 18, a mobile device 1800, such as a mobile phone or tablet computer, includes a range-finding system, such as a LIDAR system, that detects positions of points on objects 1802 in an environment of mobile device 1800. A data source of mobile device 1800 may use the signals generated by the depth detection sensor to generate a point cloud representation of objects 1802. Mobile device 1800 may include a G-PCC encoder (e.g., G-PCC encoder 200 of FIG. 1) that is configured to encode the point cloud to generate bitstreams 1804.

In the example of FIG. 18, mobile device 1800 may transmit bitstreams to a remote device 1806, such as a server system or other mobile device. Remote device 1806 may decode bitstreams 1804 to reconstruct the point cloud. In some examples, the G-PCC decoder of remote device 1806 may use radius interpolation when decoding the point cloud, as described above.

Remote device 1806 may use the point cloud for various purposes. For example, remote device 1806 may use the point cloud to generate a map of environment of mobile device 1800. For instance, remote device 1806 may generate a map of an interior of a building based on the reconstructed point cloud. In another example, remote device 1806 may generate imagery (e.g., computer graphics) based on the point cloud. For instance, remote device 1806 may use points of the point cloud as vertices of polygons and use color attributes of the points as the basis for shading the polygons. In some examples, remote device 1806 may use the reconstructed point cloud for facial recognition or other security applications.

The following numbered clauses illustrate various aspects of the disclosure.

Clause 1A: A method of encoding a point cloud includes determining a predictor to predict a current point of the point cloud; obtaining a residual value for the current point; determine whether residual prediction is to be applied for the current point; encoding a first value to indicate whether residual prediction is applied for the current point; determining a residual residual value obtained by subtracting a residual predictor from the residual value for the current point; and encoding the residual residual value.

Clause 2A: A method of decoding a point cloud includes decoding a residual residual value; decoding a first value to determine whether residual prediction is applied; determining a residual value by adding a residual predictor to the residual residual value; determining a predictor used to predict a current point of the point cloud; and using the predictor and the residual value to determine a reconstructed value of the current point.

Clause 3A: A method of encoding a point cloud includes determining a predictor to predict a current point of the point cloud; obtaining a residual value for the current point; determine whether residual prediction is to be applied for the current point; encoding a first value to indicate whether residual prediction is applied for the current point; based on residual prediction being applied for the current point, encoding a second value that indicates a residual predictor; determining a residual residual value obtained by subtracting the residual predictor from the residual value for the current point; and encoding the residual residual value.

Clause 4A: A method of decoding a point cloud includes decoding a residual residual value; decoding a first value to determine whether residual prediction is applied; based on residual prediction being applied, decoding a second value to derive a residual predictor; determining a residual value by adding the residual predictor to the residual residual value; determining a predictor used to predict a current point of the point cloud; and using the predictor and the residual value to determine a reconstructed value of the current point.

Clause 5A: A method of encoding a point cloud includes determining a predictor to predict a current point of the point cloud; obtaining a residual value for the current point;

encoding a first value to indicate whether residual prediction is applied with respect to the current point; based on residual prediction being applied with respect to the current point, determining a residual predictor based on a set of conditions; determining a residual residual value obtained by subtracting the residual predictor from the residual value for the current point; and encoding the residual residual value.

Clause 6A: A method of decoding a point cloud includes decoding a residual residual value; decoding a first value to determine whether residual prediction is applied with respect to the current point; based on residual prediction being applied with respect to the current point, determining a residual predictor based on a set of conditions; determining a residual value by adding the residual predictor to the residual residual value; determining a predictor used to predict a current point of the point cloud; and using the predictor and the residual value to determine a reconstructed value of the current point.

Clause 7A: A method of encoding a point cloud includes determining a predictor to predict a current point of the point cloud; obtaining a residual value for the current point; using a first set of conditions to determine whether residual prediction is enabled for the current point; based on residual prediction being enabled for the current point, encoding a first value to indicate whether residual prediction is applied with respect to the current point; based on residual prediction being applied with respect to the current point, determining a residual predictor based on a second set of conditions; determining a residual residual value obtained by subtracting the residual predictor from the residual value for the current point; and encoding the residual residual value.

Clause 8A: A method of decoding a point cloud includes decoding a residual residual value; using a first set of conditions to determine whether residual prediction is enabled for the current point; based on residual prediction being enabled for the current point, decoding a first value to determine whether residual prediction is applied with respect to the current point; based on residual prediction being applied with respect to the current point, determining a residual predictor based on a second set of conditions; determining a residual value by adding the residual predictor to the residual residual value; determining a predictor used to predict a current point of the point cloud; and using the predictor and the residual value to determine a reconstructed value of the current point.

Clause 9A: The method of any of clauses 1A-8A, further comprising generating the point cloud.

Clause 10A: A method of encoding or decoding a point cloud in accordance with any of the techniques of this disclosure.

Clause 11A: A device for processing a point cloud, the device comprising one or more means for performing the method of any of clauses 1A-10A.

Clause 12A: The device of example 11A, wherein the one or more means comprise one or more processors implemented in circuitry.

Clause 13A: The device of any of clauses 11A or 13A, further comprising a memory to store the data representing the point cloud.

Clause 14A: The device of any of clauses 11A-13A, wherein the device comprises a decoder.

Clause 15A: The device of any of clauses 11A-14A, wherein the device comprises an encoder.

Clause 16A: The device of any of clauses 11A-15A, further comprising a device to generate the point cloud.

Clause 17A: The device of any of clauses 11A-16A, further comprising a display to present imagery based on the point cloud.

Clause 18A: A computer-readable storage medium having stored thereon instructions that, when executed, cause one or more processors to perform the method of any of clauses 1A-10A.

Clause 1B: A device for decoding a point cloud, the device comprising: a memory configured to store data representing the point cloud; and one or more processors implemented in circuitry and configured to: decode a residual value; determine whether residual prediction is to be applied to a current point of the point cloud; in response to the determination that residual prediction is to be applied to the current point of the point cloud: determine a residual predictor and add the residual predictor to the residual value to determine a final residual value; determine a predictor used to predict a current point of the point cloud; and use the predictor and the final residual value to determine a position of the current point.

Clause 2B: The device of clause 1B, wherein to determine whether the residual prediction is applied, the one or more processors are further configured to: determine that residual prediction is applied in response to a determination that the current point is coded in an inter prediction mode and in response to a determination that a next predictor is used for inter prediction.

Clause 3B: The device of clause 1B, wherein to determine whether the residual prediction is applied, the one or more processors are further configured to: determine that the residual prediction is applied in response to a determination that the current point is coded in an intra prediction mode and in response to a determination that the predictor used to predict the current point is a delta predictor.

Clause 4B: The device of clause 1B or 3B, wherein to determine the residual predictor, the one or more processors are further configured to determine the residual predictor from one or more points in a same frame as the current point.

Clause 5B: The device of clause 1B or 2B, wherein to determine the residual predictor, the one or more processors are further configured to determine the residual predictor from one or more points in a reference frame for the current point.

Clause 6B: The device of any of clauses 1B-5B, wherein to determine the residual predictor, the one or more processors are further configured to determine the residual predictor based on one or more points in a reference frame for the current point and based on a second point in a same frame as the current point.

Clause 7B: The device of any of clauses 1B-6B, wherein the one or more processors are further configured to: decode a second value to identify the residual predictor.

Clause 8B: The device of any of clauses 1B-7B, wherein to use the predictor and the final residual value to determine the position of the current point, the one or more processors are configured to use the predictor and the final residual value to determine a radius of the current point.

Clause 9B: The device of any of clauses 1B-8B, wherein the one or more processors are further configured to reconstruct the point cloud based on the position of the current point.

Clause 10B: The device of clause 9B, wherein the one or more processors are further configured to generate a map of an interior of a building based on the reconstructed point cloud.

Clause 11B: The device of clause 9B or 10B, wherein the one or more processors are further configured to perform an autonomous navigation operation based on the reconstructed point cloud.

Clause 12B: The device of any of clauses 9B-11B, wherein the one or more processors are further configured to generate computer graphics based on the reconstructed point cloud.

Clause 13B: The device of any of clauses 9B-12B, wherein the one or more processors are configured to: determine a position of a virtual object based on the reconstructed point cloud; and generate an extended reality (XR) visualization in which the virtual object is at the determined position.

Clause 14B: The device of any of clauses 9B-13B, further comprising a display to present imagery based on the reconstructed point cloud.

Clause 15B: The device of any of clauses 1B-14B, wherein the device comprises one or more of a mobile phone, a tablet computer, a vehicle, or an extended reality device.

Clause 16B: A device for encoding a point cloud, the device comprising: a memory to store data representing the point cloud; and one or more processors implemented in circuitry and configured to: determine a predictor to predict a current point of the point cloud; determine a residual value for the current point; determine whether residual prediction is to be applied for the current point; encode syntax indicative of whether residual prediction is applied for the current point; in response to the determination that residual prediction is to be applied, determine a signaled residual value obtained by subtracting a residual predictor from the residual value for the current point; and encode the signaled residual value.

Clause 17B: The device of clause 16B, wherein to determine whether the residual prediction is to be applied, the one or more processors are further configured to: determine that residual prediction is applied in response to a determination that the current point is coded in an inter prediction mode and in response to a determination that a next predictor is used for inter prediction.

Clause 18B: The device of clause 16B, wherein to determine whether the residual prediction is applied, the one or more processors are further configured to: determine that residual prediction is applied in response to a determination that the current point is coded in an intra prediction mode and in response to a determination that the predictor used to predict the current point is a delta predictor.

Clause 19B: The device of clause 16B or 18B, wherein to determine the residual predictor, the one or more processors are further configured to determine the residual predictor from a point in a same frame as the current point.

Clause 20B: The device of clause 16B or 17B, wherein to determine the residual predictor, the one or more processors are further configured to determine the residual predictor from a point in a reference frame for the current point.

Clause 21B: The device of any of clauses 16B-20B, wherein to determine the residual predictor, the one or more processors are further configured to determine the residual predictor based on a first point in a reference frame for the current point and based on a second point in a same frame as the current point.

Clause 22B: The device of any of clauses 16B-21B, wherein the syntax indicative of whether residual prediction is applied for the current point comprises a 1B-bit flag.

Clause 23B: A method for decoding a point cloud, the method comprising: decoding a residual value; determining whether residual prediction is applied; in response to determining that residual prediction is to be applied to the current point of the point cloud: determining a residual predictor and add the residual predictor to the residual value to determine a final residual value; determining a predictor used to predict a current point of the point cloud; and using the predictor and the final residual value to determine a position of the current point.

Clause 24B: The method of clause 23B, wherein determining whether the residual prediction is applied comprises: determining that residual prediction is applied in response to determining that the current point is coded in an inter prediction mode and in response to determining that a next predictor is used for inter prediction.

Clause 25B: The method of clause 23B, wherein determining whether the residual prediction is applied comprises: determining that the residual prediction is applied in response to determining that the current point is coded in an intra prediction mode and in response to determining that the predictor used to predict the current point is a delta predictor.

Clause 26B: The method of clause 23B or 25B, wherein determining the residual predictor comprises determining the residual predictor from one or more points in a same frame as the current point.

Clause 27B: The method of clause 23B or 24B, wherein determining the residual predictor comprises determining the residual predictor from one or more points in a reference frame for the current point.

Clause 28B: The method of any of clauses 23B-27B, wherein determining the residual predictor comprises determining the residual predictor based on one or more points in a reference frame for the current point and based on a second point in a same frame as the current point.

Clause 29B: The method of any of clauses 23B-28B, further comprising: decoding a second value to identify the residual predictor.

Clause 30B: The method of any of clauses 23B-29B, wherein using the predictor and the final residual value to determine the position of the current point comprises using the predictor and the final residual value to determine a radius of the current point.

Clause 31B: The method of any of clauses 23B-30B, further comprising: reconstructing the point cloud based on the position of the current point.

Clause 32B: A computer-readable storage medium storing instructions that when executed by one or more processors cause the one or more processors to: decode a residual value; determine whether residual prediction is applied; in response to the determination that residual prediction is to be applied to the current point of the point cloud: determine a residual predictor and add the residual predictor to the residual value to determine a final residual value; determine a predictor used to predict a current point of the point cloud; and use the predictor and the final residual value to determine a position of the current point.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and micro-wave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for decoding a point cloud, the device comprising:
   a memory configured to store data representing the point cloud; and
   one or more processors implemented in circuitry and configured to:
      decode an encoded residual value;
      determine whether residual prediction is to be applied to a current point of the point cloud;
      in response to the determination that the residual prediction is to be applied to the current point:
         determine a predicted value for a final residual value for the current point, wherein the predicted value for the final residual value is different than the encoded residual value;
         add the predicted value for the final residual value to the encoded residual value to determine an actual value for the final residual value;
         determine a predictor used to predict the current point, wherein the predictor is different than the predicted value for the final residual value and the encoded residual value; and
         add the predictor and the actual value for the final residual value to determine a position of the current point.

2. The device of claim 1, wherein to determine whether the residual prediction is to be applied, the one or more processors are further configured to:
   determine that the residual prediction is to be applied in response to a determination that the current point is encoded in an inter prediction mode and in response to a determination that a next predictor is used for inter prediction.

3. The device of claim 1, wherein to determine whether the residual prediction is to be applied, the one or more processors are further configured to:
   determine that the residual prediction is to be applied in response to a determination that the current point is encoded in an intra prediction mode and in response to a determination that the predictor is a delta predictor, wherein the delta predictor corresponds to a previously decoded point in a decoding order.

4. The device of claim 1, wherein to determine the predicted value for the final residual value, the one or more processors are further configured to determine the predicted value for the final residual value from one or more points in a same frame as the current point.

5. The device of claim 1, wherein to determine the predicted value for the final residual value, the one or more processors are further configured to determine the predicted value for the final residual value from one or more points in a reference frame for the current point.

6. The device of claim 1, wherein to determine the predicted value for the final residual value, the one or more processors are further configured to determine the predicted value for the final residual value based on one or more points in a reference frame for the current point and based on a second point in a same frame as the current point.

7. The device of claim 1, wherein the one or more processors are further configured to:
   decode a second value to identify the predicted value for the final residual value.

8. The device of claim 1, wherein to add the predictor and the actual value for the final residual value to determine the position of the current point, the one or more processors are configured to add the predictor and the actual value for the final residual value to determine a radial distance of the current point from an origin point.

9. The device of claim 1, wherein the one or more processors are further configured to generate a reconstructed point cloud based on the position of the current point.

10. The device of claim 9, wherein the one or more processors are further configured to generate a map of an interior of a building based on the reconstructed point cloud.

11. The device of claim 9, wherein the one or more processors are further configured to perform an autonomous navigation operation based on the reconstructed point cloud.

12. The device of claim 9, wherein the one or more processors are further configured to generate computer graphics based on the reconstructed point cloud.

13. The device of claim 9, wherein the one or more processors are configured to:

determine a position of a virtual object based on the reconstructed point cloud; and generate an extended reality (XR) visualization in which the virtual object is at the position of the virtual object.

14. The device of claim 9, further comprising a display to present imagery based on the reconstructed point cloud.

15. The device of claim 1, wherein the device comprises one or more of a mobile phone, a tablet computer, a vehicle, or an extended reality device.

16. A device for encoding a point cloud, the device comprising:

a memory to store data representing the point cloud; and one or more processors implemented in circuitry and configured to:

determine a predictor to predict a current point of the point cloud;

determine an actual value for a final residual value for the current point;

determine whether residual prediction is to be applied to the current point;

encode syntax indicative of whether the residual prediction is to be applied to the current point;

in response to the determination that the residual prediction is to be applied to the current point:

determine a predicted value for the final residual value for the current point; and determine a signaled residual value obtained by subtracting the actual value for the final residual value from the predicted value for the final residual value for the current point, wherein the signaled residual value is different than the predicted value for the final residual value; and encode the signaled residual value.

17. The device of claim 16, wherein to determine whether the residual prediction is to be applied to the current point, the one or more processors are further configured to:

determine that the residual prediction is to be applied to the current point in response to a determination that the current point is encoded in an inter prediction mode and in response to a determination that a next predictor is used for inter prediction.

18. The device of claim 16, wherein to determine whether the residual prediction is to be applied, the one or more processors are further configured to:

determine that the residual prediction is to be applied in response to a determination that the current point is encoded in an intra prediction mode and in response to a determination that the predictor used to predict the current point is a delta predictor, wherein the delta predictor corresponds to a previously decoded point in a decoding order.

19. The device of claim 16, wherein to determine the predicted value for the final residual value, the one or more processors are further configured to determine the predicted value for the final residual value from a point in a same frame as the current point.

20. The device of claim 16, wherein to determine the predicted value for the final residual value, the one or more processors are further configured to determine the predicted value for the final residual value from a point in a reference frame for the current point.

21. The device of claim 16, wherein to determine the predicted value for the final residual value, the one or more processors are further configured to determine the predicted value for the final residual value based on a first point in a reference frame for the current point and based on a second point in a same frame as the current point.

22. The device of claim 16, wherein the syntax indicative of whether the residual prediction is to be applied for the current point comprises a 1-bit flag.

23. A method for decoding a point cloud, the method comprising:

decoding an encoded residual value;

determining whether residual prediction is to be applied to a current point of the point cloud;

in response to determining that the residual prediction is to be applied to the current point:

determining a predicted value for a final residual value for the current point, wherein the predicted value for the final residual value is different than the encoded residual value;

adding the predicted value for the final residual value to the encoded residual value to determine an actual value for the final residual value;

determining a predictor used to predict the current point, wherein the predictor is different than the predicted value for the final residual value and the encoded residual value; and adding the predictor and the actual value for the final residual value to determine a position of the current point.

24. The method of claim 23, wherein determining whether the residual prediction is to be applied to the current point comprises:

determining that the residual prediction is to be applied to the current point in response to determining that the current point is encoded in an inter prediction mode and in response to determining that a next predictor is used for inter prediction.

25. The method of claim 23, wherein determining whether the residual prediction is to be applied to the current point comprises:

determining that the residual prediction is to be applied in response to determining that the current point is encoded in an intra prediction mode and in response to determining that the predictor is a delta predictor, wherein the delta predictor corresponds to a previously decoded point in a decoding order.

26. The method of claim 23, wherein determining the predicted value for the final residual value comprises determining the predicted value for the final residual value from one or more points in a same frame as the current point.

27. The method of claim 23, wherein determining the predicted value for the final residual value comprises determining the predicted value for the final residual value from one or more points in a reference frame for the current point.

28. The method of claim 23, wherein determining the predicted value for the final residual value comprises determining the predicted value for the final residual value based on one or more points in a reference frame for the current point and based on a second point in a same frame as the current point.

29. The method of claim 23, wherein adding the predictor and the actual value for the final residual value to determine the position of the current point comprises adding the predictor and the actual value for the final residual value to determine a radial distance of the current point from an origin point.

30. A non-transitory computer-readable storage medium storing instructions that when executed by one or more processors cause the one or more processors to:

decode an encoded residual value;

determine whether residual prediction is to be applied to a current point of a point cloud;

in response to the determination that the residual prediction is to be applied to the current point:

determine a predicted value for a final residual value for the current point, wherein the predicted value for the final residual value is different than the encoded residual value;

add the predicted value for the final residual value to the encoded residual value to determine an actual value for the final residual value;

determine a predictor used to predict the current point, wherein the predictor is different than the predicted value for the final residual value and the encoded residual value; and add the predictor and the actual value for the final residual value to determine a position of the current point.

* * * * *